United States Patent
Lamb

(10) Patent No.: US 9,258,256 B2
(45) Date of Patent: Feb. 9, 2016

(54) INVERSE PCP FLOW REMAPPING FOR PFC PAUSE FRAME GENERATION

(71) Applicant: Netronome Systems, Inc., Santa Clara, CA (US)

(72) Inventor: Joseph M. Lamb, Hopkinton, MA (US)

(73) Assignee: Netronome Systems, Inc., Santa Clara, CA (US)

( * ) Notice: Subject to any disclaimer, the term of this patent is extended or adjusted under 35 U.S.C. 154(b) by 22 days.

(21) Appl. No.: 14/321,762

(22) Filed: Jul. 1, 2014

(65) Prior Publication Data

US 2016/0006677 A1   Jan. 7, 2016

(51) Int. Cl.
| | |
|---|---|
| G06F 13/00 | (2006.01) |
| G06F 13/18 | (2006.01) |
| G06F 13/362 | (2006.01) |
| H04L 12/70 | (2013.01) |
| H04L 12/931 | (2013.01) |
| H04L 12/861 | (2013.01) |
| H04L 12/947 | (2013.01) |

(52) U.S. Cl.
CPC ............ *H04L 49/9057* (2013.01); *H04L 49/25* (2013.01); *H04L 49/70* (2013.01)

(58) Field of Classification Search
CPC ....... H04L 49/25; H04L 49/90; H04L 49/252; H04L 49/352; H04L 49/9057; H04L 49/901; H04L 49/9015; H04L 12/54; H04L 12/56; H04L 2012/5605; H04L 2012/5678; H04L 2012/568; H04L 2012/5681; H04L 2012/5682; H04L 2012/5684; H04L 2012/5697
See application file for complete search history.

(56) References Cited

U.S. PATENT DOCUMENTS

| | | | | |
|---|---|---|---|---|
| 7,444,473 B1* | 10/2008 | Koster | ................ | G06F 12/0811 711/119 |
| 7,664,115 B1* | 2/2010 | Robotham | .......... | H04L 12/5601 370/395.43 |
| 8,750,320 B2* | 6/2014 | Black | .................. | H04L 12/4625 370/403 |
| 8,972,623 B2* | 3/2015 | Harper | .................. | G06F 3/0604 370/230 |
| 2007/0171914 A1* | 7/2007 | Kadambi | ............ | H04L 12/4641 370/395.2 |
| 2010/0054268 A1* | 3/2010 | Divivier | ............. | G06F 13/4022 370/412 |
| 2011/0064086 A1* | 3/2011 | Xiong | ................... | H04L 49/357 370/401 |
| 2013/0219091 A1* | 8/2013 | Stark | ....................... | H04L 45/50 710/104 |
| 2013/0315256 A1* | 11/2013 | Balakavi | ............... | H04L 49/602 370/401 |
| 2014/0330991 A1* | 11/2014 | Harper | ................. | G06F 3/0604 710/18 |
| 2015/0127864 A1* | 5/2015 | Stark | ................... | G06F 13/3625 710/117 |

* cited by examiner

*Primary Examiner* — Ahmed Elallam
(74) *Attorney, Agent, or Firm* — Imperium Patent Works LLP; T. Lester Wallace; Mark D. Marrello

(57) ABSTRACT

An overflow threshold value is stored for each of a plurality of virtual channels. A link manager maintains, for each virtual channel, a buffer count. If the buffer count for a virtual channel is detected to exceed the overflow threshold value for a virtual channel whose originating PCP flows were merged, then a PFC (Priority Flow Control) pause frame is generated where multiple ones of the priority class enable bits are set to indicate that multiple PCP flows should be paused. For the particular virtual channel that is overloaded, an Inverse PCP Remap LUT (IPRLUT) circuit performs inverse PCP mapping, including merging and/or reordering mapping, and outputs an indication of each of those PCP flows that is associated with the overloaded virtual channel. Associated physical MAC port circuitry uses this information to generate the PFC pause frame so that the appropriate multiple enable bits are set in the pause frame.

20 Claims, 22 Drawing Sheets

GENERATION OF PFC PAUSE FRAMES IN A PCP FLOW MERGING AND/OR PCP FLOW REORDERING SYSTEM

NETWORK APPLIANCE

INGRESS NBI ISLAND

EGRESS NBI ISLAND

INGRESS MAC ISLAND IN MORE DETAIL

PART OF THE INGRESS MAC ISLAND IN MORE DETAIL

KEY TO FIG. 10

PART OF THE INGRESS MAC ISLAND IN MORE DETAIL

ETHERNET FRAME

| SERDES NUMBER | LANE NUMBER | PHYSICAL PORT NUMBER | PCP PRIORITY LEVEL | REMAPED PCP PRIORITY LEVEL | VIRTUAL CHANNELS (128 MAX) | CORE NUMBER | VIRTUAL CHANNEL NUMBER (6-B9T BINARY) | BASE (6-BIT) | NUM (4-BIT) | |
|---|---|---|---|---|---|---|---|---|---|---|
| 1 | 1 | 1 | 0 | 0 | 0 | 0 | 000000 | 000000 | 0101 | |
| 1 | 1 | 1 | 1 | 1 | 1 | 0 | 000001 | | | |
| 1 | 1 | 1 | 2 | 2 | 2 | 0 | 000010 | | | PCP MERGING MERGE MULTIPLE PCP LEVEL FLOWS INTO ONE VIRTUAL CHANNEL |
| 1 | 1 | 1 | 3 | 3 | 3 | 0 | 000011 | | | |
| 1 | 1 | 1 | 4 | 4 | 4 | 0 | 000100 | | | |
| 1 | 1 | 1 | 5 | 5 | 5 | 0 | 000101 | | | |
| 1 | 1 | 1 | 6 | 5 | | | | | | |
| 1 | 1 | 1 | 7 | 5 | | | | | | |
| 1 | 2 | 2 | 0 | 0 | 6 | 0 | 000110 | 000110 | 1000 | |
| 1 | 2 | 2 | 1 | 1 | 7 | 0 | 000111 | | | |
| 1 | 2 | 2 | 2 | 2 | 8 | 0 | 001000 | | | PCP REORDERING REORDER PRIORITY OF PCP LEVEL FLOWS AS THEY ARE ASSIGNED TO VIRTUAL CHANNELS |
| 1 | 2 | 2 | 3 | 4 | 9 | 0 | 001001 | | | |
| 1 | 2 | 2 | 4 | 5 | 10 | 0 | 001010 | | | |
| 1 | 2 | 2 | 5 | 3 | 11 | 0 | 001011 | | | |
| 1 | 2 | 2 | 6 | 6 | 12 | 0 | 001100 | | | |
| 1 | 2 | 2 | 7 | 7 | 13 | 0 | 001101 | | | |
| 1 | 3 | 3 | 0 | 0 | | | | 001101 | 0010 | |
| 1 | 3 | 3 | 1 | 0 | | | | | | |
| 1 | 3 | 3 | 2 | 0 | | | | | | PCP MERGING MERGE MULTIPLE PCP LEVEL FLOWS INTO ONE VIRTUAL CHANNEL |
| 1 | 3 | 3 | 3 | 0 | 14 | 0 | 001101 | | | |
| 1 | 3 | 3 | 4 | 0 | | | | | | |
| 1 | 3 | 3 | 5 | 0 | | | | | | |
| 1 | 3 | 3 | 6 | 0 | | | | | | |
| 1 | 3 | 3 | 7 | 1 | 15 | 0 | 001110 | | | |
| 1 | 4 | 4 | 0 | 0 | 16 | 0 | 001111 | 001111 | 1000 | |
| ... | ... | ... | ... | ... | ... | | | | | |
| 6 | 4 | 24 | 6 | 6 | 126 | 1 | 111110 | 111000 | 1000 | |
| 6 | 4 | 24 | 7 | 7 | 127 | 1 | 111111 | | | |

ONE ILLUSTRATIVE CONFIGURATION OF THE INGRESS MAC ISLAND
24x10Gbps PORTS

FIG. 13

| PCP PRIORITY LEVEL | REMAPPED PCP PRIORITY LEVEL |
|---|---|
| 0 | 0 |
| 1 | 1 |
| 2 | 2 |
| 3 | 3 |
| 4 | 4 |
| 5 | 5 |
| 6 | 5 |
| 7 | 5 |

PCP REMAP LUT CONTENTS FOR PHYSICAL PORT NUMBER 1

| PCP PRIORITY LEVEL | REMAPPED PCP PRIORITY LEVEL |
|---|---|
| 0 | 0 |
| 1 | 1 |
| 2 | 2 |
| 3 | 4 |
| 4 | 5 |
| 5 | 3 |
| 6 | 6 |
| 7 | 7 |

PCP REMAP LUT CONTENTS FOR PHYSICAL PORT NUMBER 2

ETHERNET PFC PAUSE FRAME GENERATED AS A RESULT OF INVERSE PCP REMAPPING IN AN OVERLOAD CONDITION

A DUAL LINK LIST FOR VIRTUAL CHANNEL 1

TIMELINE FOR OPERATION OF PIPELINED MEMORY SYSTEM FOR RAPID HEAD POINTER READS (OF A LINKED LIST FOR A SINGLE VIRTUAL CHANNEL)

THE BUFFER ID ("B3") IS PUSHED INTO THE TAIL.

B3 IS LOADED INTO THE TAIL QUEUE ELEMENT.

B3 IS ALSO WRITTEN INTO THE MEMORY AT THE LOCATION POINTED TO BY THE OLD TAIL POINTER VALUE ("B2"). B2 IS USED AS AN ADDRESS TO STORE B3 INTO THE MEMORY.

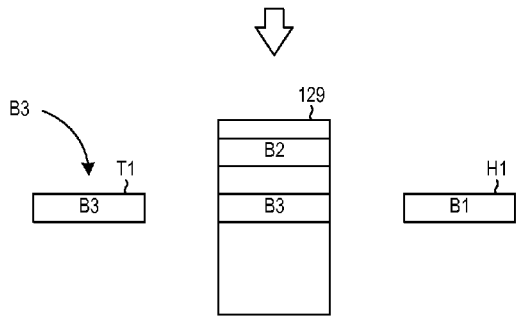

QUEUE STORES THREE BUFFER IDs.

THE BUFFER ID ("B4") IS PUSHED INTO THE TAIL.

B4 IS LOADED INTO THE TAIL QUEUE ELEMENT.

B4 IS ALSO WRITTEN INTO THE MEMORY AT THE LOCATION POINTED TO BY THE OLD TAIL POINTER VALUE ("B3"). B3 IS USED AS AN ADDRESS TO STORE B4 INTO THE MEMORY.

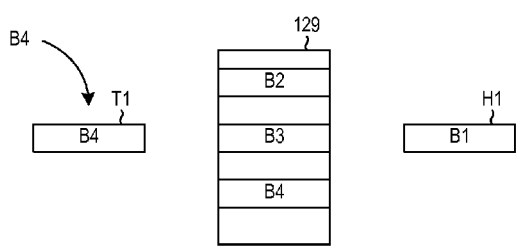

QUEUE STORES FOUR BUFFER IDs.

OPERATION OF ONE OF THE LINKED LISTS OF
A DUAL LINKED LIST OF BUFFERS

FIG. 20B

OPERATION OF ONE OF THE LINKED LISTS OF
A DUAL LINKED LIST OF BUFFERS

INVERSE PCP FLOW REMAPPING FOR PFC PAUSE FRAME GENERATION

TECHNICAL FIELD

The described embodiments relate generally to MAC frame ingress processing circuits and methods.

SUMMARY

A Network Flow Processor (NFP) integrated circuit includes a plurality of SerDes circuits and a Media Access Control (MAC) layer interface circuit. The SerDes and MAC layer interface circuit are configurable into a first number of physical MAC ports. The NFP integrated circuit receives, via each of the physical MAC ports, one or more PCP (Priority Code Point) flows. A PCP flow is a flow of frames received onto the same physical MAC port, where all the frames have the same PCP code value. Each PCP flow received via a particular physical MAC port has a relative priority with respect to each other PCP flow received via that physical MAC port. In addition to the SerDes circuits and the MAC layer interface circuit, the NFP integrated circuit further includes a plurality of port enqueue engines, a pipelined buffer memory, a plurality of port dequeue engines, and a single minipacket parallel bus. For each of a second number of virtual channels, a corresponding linked list of buffers is maintained in the memory. There is one port enqueue engine for each physical MAC port. For each PCP flow of frames received via the physical MAC port associated with a port enqueue engine, the port enqueue engine causes frame data of the frames of the PCP flow to be loaded into buffers of one particular linked list of buffers. The port dequeue engine associated with the physical MAC port dequeues the linked list of buffers, thereby causing the frame data of the PCP flow or flows stored in the linked list of buffers to be output onto the single minipacket parallel bus. Accordingly, all incoming frame data from all the virtual channels is output onto the same one minipacket parallel bus, with each 256-byte minipacket having an associated virtual channel number that indicates the virtual channel. Further network processing functionality of the NFP integrated circuit receives the frame data from the minipacket bus and performs further network processing. This further network processing functionality implements the second number of virtual channels through the remainder of the NFP integrated circuit.

In a first novel aspect, each port enqueue engine has a PCP Remap LUT (PRLUT) and associated circuitry that causes multiple PCP flows to be merged so that the frame data for the multiple PCP flows is all assigned to the same one virtual channel. Accordingly, the frame data for the multiple PCP flows is loaded into the same one linked list of buffers in the memory, where the linked list of buffers is the linked list of buffers for the virtual channel. Due to the PCP flow merging of flows of a physical MAC port, the second number can be, and is in one embodiment, smaller than the first number multiplied by eight. The number of virtual channels can be, and is in one embodiment, smaller than the number of physical MAC ports multiplied by eight (the number of PCP priority levels that can be defined by the three-bit PCP code value of incoming frames).

In a second novel aspect, the PCP Remap LUT (PRLUT) of a port enqueue engine does not cause PCP flows to be merged so that the frame data of multiple PCP flows is assigned to one virtual channel, but rather the PRLUT is configured so that the relative priorities of the PCP flows are reordered and changed (with respect to one another) as the PCP flows are assigned to virtual channels. For example, a higher priority PCP flow whose PCP value is a larger value is assigned to a lower priority virtual channel having a lower virtual channel numbers, whereas a lower priority PCP flow whose PCP value is a smaller value is assigned to a higher priority virtual channel having a higher virtual channel number. In this example, within the virtual channels for a given physical MAC port, the higher the virtual channel number is the higher the priority of the virtual channel is.

In one embodiment, a PRLUT is configured to carry out PCP flow merging on some PCP flows, and to also perform PCP flow reordering. In another embodiment, a first port enqueue engine causes PCP flow merging to occur, whereas a second port enqueue engine causes PCP reordering to occur. The PRLUTs of the port enqueue engines are independently configurable.

In a third novel aspect, each linked list of buffers that stores frame data is not actually a single linked list of buffers, but rather is a dual linked list of buffers. In addition, a free buffer linked list of buffers is also a dual linked list of buffers. The dual linked lists of buffers are maintained by a link manager. The term "linked list of buffers" as the term is used here refers to a linked list of queue elements that stores buffer identification values (buffer IDs) along with the corresponding buffers that are identified by the buffer IDs. The link manager maintains, for each such dual linked list of buffers, a first head pointer queue element H1, a second head pointer queue element H2, a first tail pointer queue element T1, a second tail pointer queue element T2, a head pointer active bit, and a tail pointer active bit. The first head pointer queue element and the first tail pointer queue element are used to maintain the first linked list of the dual linked list. The second head pointer queue element and the second tail pointer queue element are used to maintain the second linked list of the dual linked list. When a sequence of values (a sequence of buffer IDs) is pushed into the dual linked list of buffers, odd values of the sequence are pushed into the first tail pointer queue element so that odd values are stored in the first linked list of buffer elements, whereas even values of the sequence are pushed into the second tail pointer queue element so that even values are stored in the second linked list of buffer elements. The tail pointer active bit indicates which tail pointer queue element will receive the next value to be pushed. The value of the tail pointer active bit is toggled from push to push. When a sequence of values is popped out of the dual linked list of buffers, odd values of the sequence are popped off the first head pointer queue element, whereas even values are popped off the second head pointer queue element. The head pointer active bit indicates which head pointer queue element will be popped next. The value of the head pointer active bit is toggled from pop to pop.

In one example, the memory that stores queue elements other than the head and tail pointer queue elements is a pipelined memory. The pipelined memory has a read access latency time for reading the value stored in a queue element. Due to the pipelined nature of the memory, however, the dual linked list system can pop the dual linked list of values and supply dequeued values at a sustained rate of more than one value per the read access latency time. For example, if the dual linked list system is popped twice in rapid succession, then the pipelined memory will be performing multiple read operations of multiple queue elements at a given time with the read operations following each other in sequence through the stages of the pipelined memory. The first head pointer queue element is popped, and then a memory read is initiated to replenish the first head pointer queue element. Before this replenishing has been completed, the second pop of the dual linked list occurs, thereby resulting in a pop of the second head pointer queue element. A value can be popped out of the second head pointer queue element at a time when the memory is in the process of being read to replenish the first head pointer queue element. A second read of the memory is also initiated to replenish the second head pointer queue element. At this time, both the first and second read operations are occurring simultaneously, albeit with the first read operation leading the second through the various stages of the pipelined memory.

The use of multiple linked lists to realize a faster access single linked list is extendable. For example, three different linked lists can be maintained together by the link manager in order to realize a triple linked list. Likewise, four different linked lists can be maintained together by the link manager in order to realize a quadruple linked list, and so forth. The values stored in these linked lists are typically buffer IDs, where each such buffer ID identifies a corresponding buffer.

In a fourth novel aspect, the link manager stores a predetermined and preconfigured "overflow threshold value" for virtual channel. The link manager also maintains, for each virtual channel, a buffer count where the buffer count is the number of buffers (in the linked list of buffers for the virtual channel) that currently store frame data. In addition, in this fourth novel aspect, PCP flow merging and/or reordering was performed on enqueue. As frames are received on the NFP integrated circuit and are stored in a linked list of buffers, if the buffer count for a virtual channel is detected to exceed the "overflow threshold value" for a virtual channel whose originating PCP flows were merged, then a PFC (Priority Flow Control) pause frame is generated where multiple ones of the priority class enable bits are set to indicate that multiple PCP flows should be paused. The setting of a priority class enable bit in the PFC pause frame is an indication to a receiver of the PFC pause frame that the PCP flow corresponding to that priority level should be paused. For the particular virtual channel that is determined to be overloaded, an Inverse PCP Remap LUT (IPRLUT) circuit in the port enqueue engine performs inverse PCP mapping, including inverse PCP merging and/or inverse PCP reordering, and outputs a multi-bit value. The multi-bit value indicates each of those PCP flows that is associated with the overloaded virtual channel. For each PCP flow identified in this way, the corresponding bit in an 8-bit priority class enable vector is set. The 8-bit priority class enable vector is supplied by the port enqueue engine to its corresponding physical MAC port. The physical MAC port in turn uses the 8-bit priority class enable vector to generate the PFC pause frame so that the appropriate multiple enable bits are set in the pause frame. The physical MAC port then outputs the PFC pause frame from the NFP integrated circuit. The inverse PCP remap operation reverses the effect of PCP flow merging as well as PCP flow reordering, and ensures that the correct PCP flows are paused in response to the detecting of a virtual channel overload condition.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 13 is a diagram that illustrates PCP flow merging in accordance with a first novel aspect, and that illustrates PCP flow reordering in accordance with a second novel aspect.

FIG. 20B is a part of a larger diagram (FIG. 20) that illustrates a pushing and a popping of another embodiment of one of the two linked lists of a novel dual linked list.

DETAILED DESCRIPTION

Reference will now be made in detail to background examples and some embodiments of the invention, examples of which are illustrated in the accompanying drawings.

Figure 1:
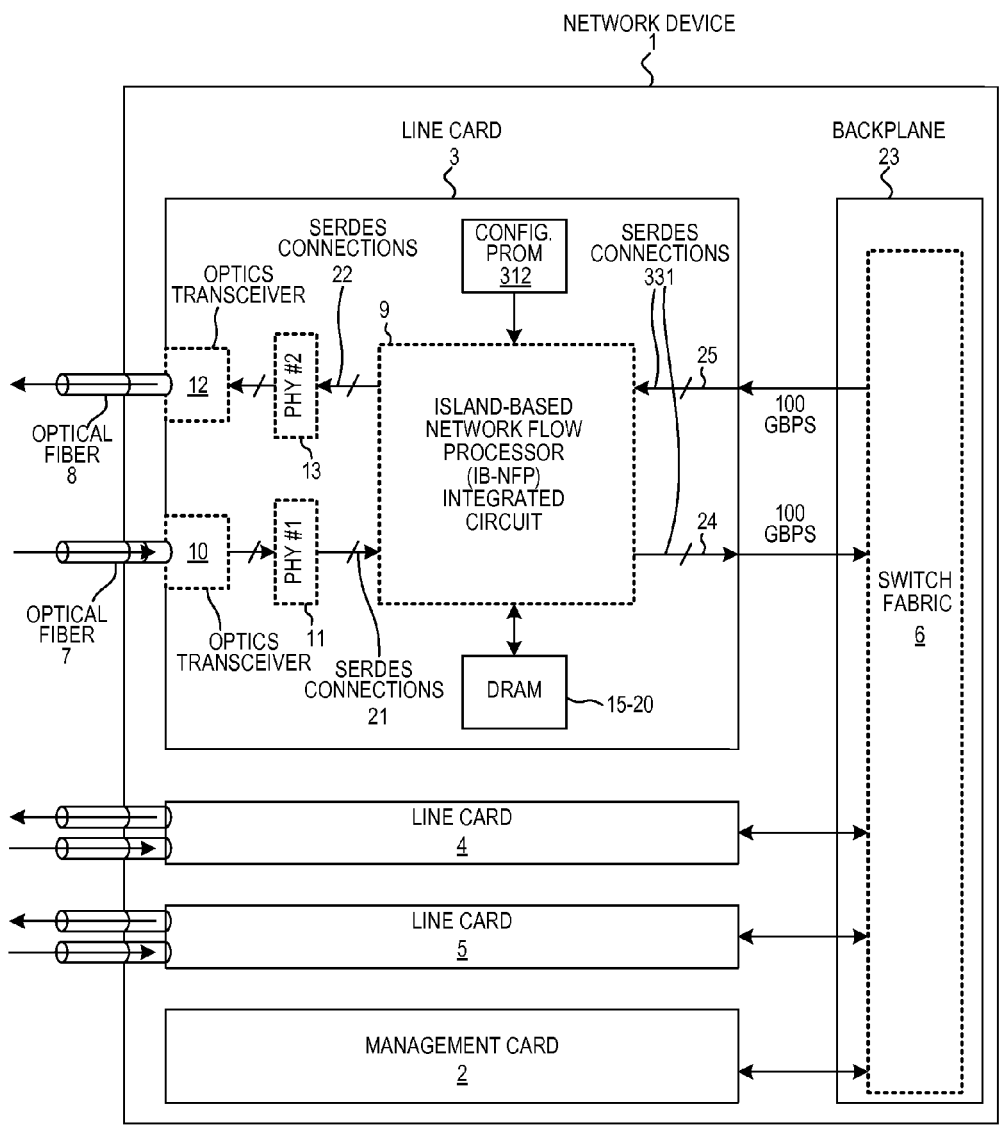
FIG. 1 is a diagram of a network device 1 in accordance with one novel aspect.

FIG. 1 is a high-level block diagram of a network device 1 in accordance with one novel aspect. The network device 1 includes and management card 2 and multiple line cards 3, 4 and 5, that are coupled to a backplane 23. The line cards are of identical construction. Each line card can receive 120 Gbps (gigabits per second) packet traffic via fiber optic cable 7 and can also transmit 120 Gbps packet traffic out of fiber optic cable 8. Each line card can also receive 100 Gbps packet traffic from the switch fabric 6 and can also transmit 100 Gbps packet traffic to the switch fabric 6. Line card 3 includes, among other parts not illustrated, a Network Flow Processor (NFP) integrated circuit 9, a first optical transceiver 10, a first PHY integrated circuit 11, a second optical transceiver 12, a second PHY integrated circuit 13, a configuration Programmable Read Only Memory (PROM) 14, and an amount of external Dynamic Random Access Memory (DRAM) 15-20. Packet data received from a network via optical cable 7 is converted into electrical signals by first optical transceiver 10. First PHY integrated circuit 11 receives the packet data in electrical form and forwards the packet data to the NFP integrated circuit 9 via SerDes connections 21. In one example, the packets are directed out of the line card 3 to optical fiber 8 via SerDes connections 22, second PHY integrated circuit 13, and the second optical transceiver 12. Alternatively, the packets are directed from the NFP integrated circuit 9 to the switch fabric 6 via SerDes connections 24. Packet data from the switch fabric 6 can also be communicated from the switch fabric 6, across SerDes connections 25, and to the NFP integrated circuit 9. In one example, this packet data is directed to pass out of the NFP integrated circuit 9 and to optical fiber 8. In another example, this packet data is directed to pass out of the NFP integrated circuit 9 and back to the switch fabric 6 via SerDes connections 24. Data passing through the NFP integrated circuit 9 may be buffered in the DRAM 15-20.

Figure 2:
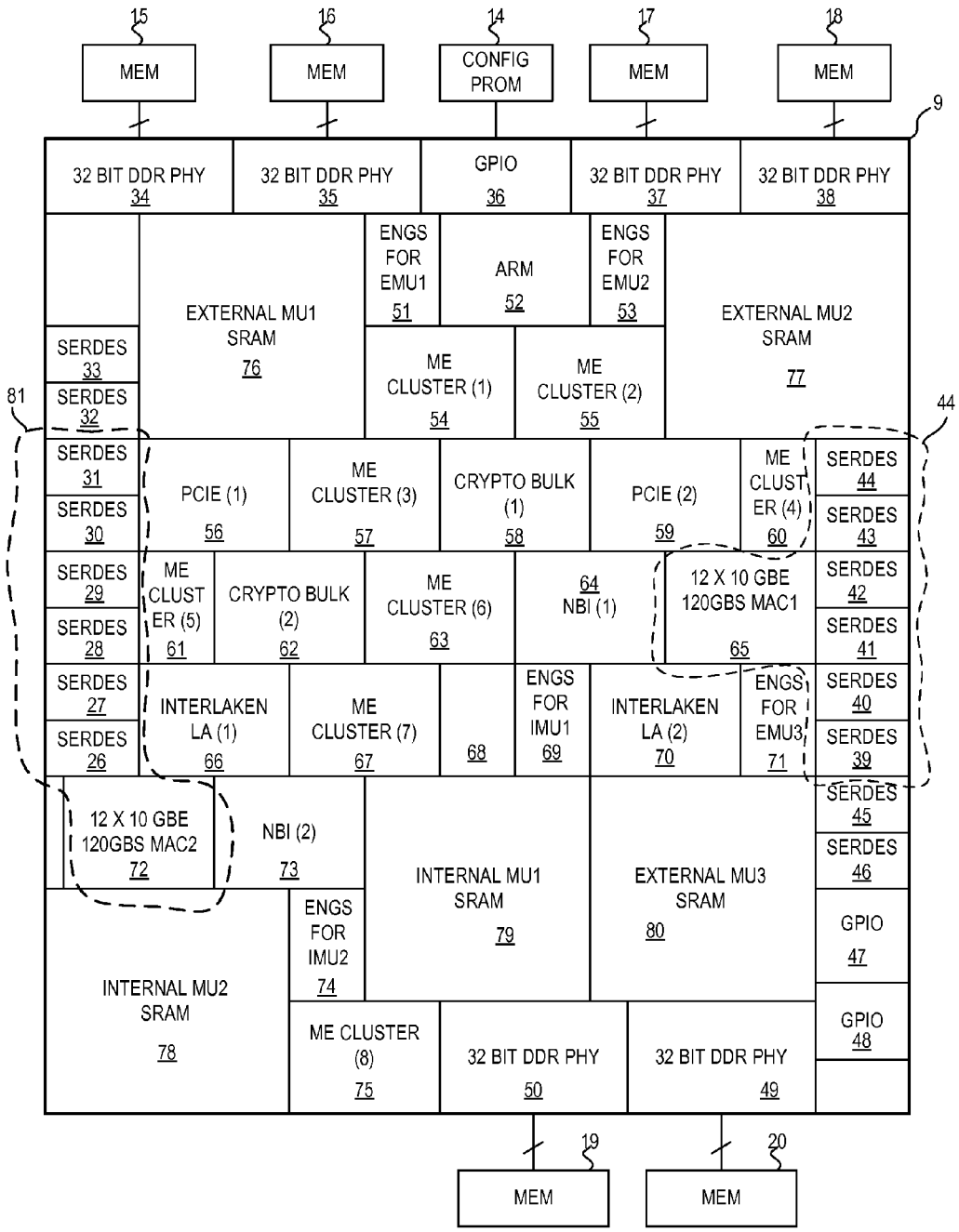
FIG. 2 is a simplified top-down diagram of the NFP integrated circuit of the network device of FIG. 1.

FIG. 2 is a top-down diagram of the NFP integrated circuit 9 of FIG. 1. The NFP integrated circuit 9 includes a peripheral first area of input/output circuit blocks 26-50. SerDes circuit blocks 26-31 are usable to communicate with optical fibers 7 and 8. Each of these SerDes circuits is duplex in that it has four 10 Gbps lanes for receiving SerDes information and it also has four 10 Gbps lanes for transmitting SerDes information. A SerDes circuit can communicate information in both directions simultaneously. Respective ones of the DDR physical interfaces 34, 35, 37, 38, 49 and 50 are used to communicate with corresponding external memory integrated circuits 15-20, respectively. GPIO interface block 36 is used to receive configuration information from external PROM 14.

In addition to the first peripheral area of I/O blocks, the NFP integrated circuit 9 also includes a second tiling area of islands 51-75. Each of the islands 51-75 is either a full rectangular shape, or is half the size of the full rectangular shape. For example, the island 67 is a full island. The island 69 is a half island. The functional circuits in the various islands of this second tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern.

In addition to the second tiling area, there is a third area of larger sized blocks 76-80. The mesh bus structures do not extend into or over any of these larger blocks. The functional circuitry of a larger sized block may connect by direct dedicated connections to an interface island within the tiling area and through this interface island achieve connectivity to the mesh buses and other islands.

Figure 3:
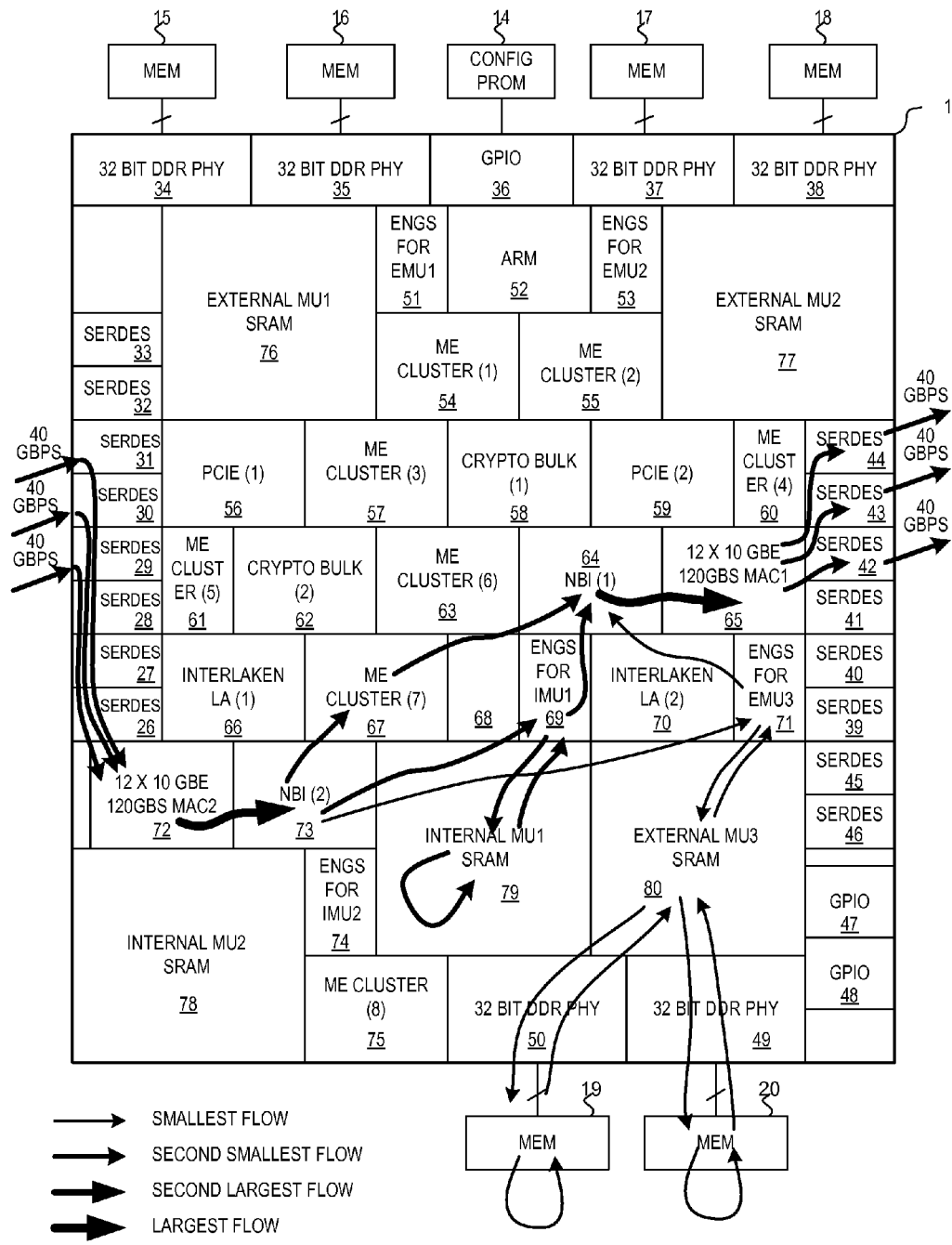
FIG. 3 is a diagram that illustrates a flow of network information through the NFP integrated circuit of FIG. 2.

FIG. 3 is a diagram that illustrates one example of packet traffic passing through the NFP integrated circuit 9 of FIG. 1. Packet traffic is received onto the line card 3 from optical fiber 7, and passes through optics transceiver 10, and PHY integrated circuit 11, and across SerDes connections 21 into three SerDes circuit blocks 29, 30 and 31. Each of the three SerDes circuit blocks has four 10 Gbps input lanes, so overall the SerDes circuit block can receive incoming packet data at a rate of 40 Gbps. The incoming packet data is spread over three such SerDes circuit blocks, so the NFP integrated circuit 9 can receive 120 Gbps packet data from optical fiber 7. The packet data in this particular example passes through dedicated connections from three SerDes circuit blocks 29-31 to the ingress MAC island 72. The dashed line 81 in FIG. 2 indicates the six SerDes circuit blocks that are coupled by dedicated connections to the ingress MAC island 72. Ingress MAC island 72 converts successive symbols delivered by the physical coding layer into packets by mapping symbols to octets, by performing packet framing, and then by buffering the resulting packets in an SRAM memory for subsequent communication to other processing circuitry. After buffering in the SRAM, the resulting packets are communicated from ingress MAC island 72 across a single private inter-island minipacket bus, to ingress NBI (Network Bus Interface) island 73. Prepended to the beginning of each packet is a MAC prepend value that contains information about the packet and results of analyses (parse results PR) performed by the ingress MAC island.

For each packet, the functional circuitry of ingress NBI island 73 examines fields in the header portion to determine what storage strategy to use to place the packet into memory. In one example, the ingress NBI island examines the header portion and from that determines whether the packet is an exception packet or whether the packet is a fast-path packet. If the packet is an exception packet, then the ingress NBI island 73 determines a first storage strategy to be used to store the packet so that relatively involved exception processing can be performed efficiently, whereas if the packet is a fast-path packet then the ingress NBI island determines a second storage strategy to be used to store the packet for more efficient transmission of the packet from the NFP integrated circuit 9. The ingress NBI island examines a packet header, performs packet preclassification, determines that the packet is a fast-path packet, and determines that the header portion of the packet should passes to ME (Microengine) island 67. The header portion of the packet is therefore communicated across the configurable mesh data bus from ingress NBI island 73 to ME island 67. The ME island 67 determines header modification and queuing strategy for the packet based on the packet flow (derived from packet header and contents) and the ME island 67 informs a second NBI island 64 (also referred to as an egress NBI island) of these. In this simplified example being described, the payload portions of fast-path packets are placed into internal SRAM (Static Random Access Memory) MU block 79 and the payload portions of exception packets are placed into external DRAM 19 and 20.

Half island 68 is an interface island through which all information passing into, and out of, SRAM MU block 79 passes. The functional circuitry within half island 68 serves as the interface and control circuitry for the SRAM within block 79. Accordingly, the payload portion of the incoming fast-path packet is communicated from ingress NBI island 73, across the configurable mesh data bus to SRAM control island 68, and from control island 68, to the interface circuitry in block 79, and to the internal SRAM circuitry of block 79. The internal SRAM of block 79 stores the payloads so that they can be accessed for flow determination by the ME island 67.

In addition, a preclassifier in the ingress NBI island 73 determines that the payload portions for others of the packets should be stored in external DRAM 19 and 20. For example, the payload portions for exception packets are stored in external DRAM 19 and 20. Interface island 71, IP block 80, and DDR PHY I/O blocks 49 and 50 serve as the interface and control for external DRAM integrated circuits 19 and 20. The payload portions of the exception packets are therefore communicated across the configurable mesh data bus from ingress NBI island 73, to interface and control island 71, to external MU SRAM block 80, to 32-bit DDR PHY I/O blocks 49 and 50, and to external DRAM integrated circuits 19 and 20. At this point in the operational example, the packet header portions and their associated payload portions are stored in different places. The payload portions of fast-path packets are stored in internal SRAM in MU block 79, whereas the payload portions of exception packets are stored in external memories 19 and 20.

ME island 67 informs egress NBI island 64 where the packet headers and the packet payloads can be found and provides the egress NBI island 64 with an egress packet descriptor for each packet. The egress packet descriptor indicates a queuing strategy to be used on the packet. Egress NBI island 64 uses the egress packet descriptor to read the packet headers and any header modification from ME island 667 and to read the packet payloads from either internal SRAM 79 or external DRAMs 19 and 20. Egress NBI island 64 places packet descriptors for packets to be output into the correct order. For each packet that is then scheduled to be transmitted, the egress NBI island uses the packet descriptor to read the header portion and any header modification and the payload portion and to assemble the packet to be transmitted. The egress NBI island then performs packet modification on the packet, and the resulting modified packet then passes from egress NBI island 64 and to egress MAC island 65.

Egress MAC island 65 buffers the packets, and converts them into symbols. The symbols are then delivered by dedicated conductors from the MAC island 65 to three SerDes circuits 42-44. The dashed line 82 in FIG. 2 indicates the six SerDes circuits that are coupled by dedicated connections to the egress MAC island 65. Although the SerDes circuits 42-44 together can provide 120 Gbps of communication throughput, the throughput out of NFP integrated circuit 9 to the switch fabric 6 is limited to 100 Gbps by the switch fabric. From SerDes circuits 42-44, the 100 Gbps outgoing packets pass out of the NFP integrated circuit 9 and across SerDes connections 24 and to switch fabric 6.

The term "packet" is used in the description above in a somewhat loose and colloquial way as is common in the art. More particularly, incoming symbols are converted into MAC layer "frames", such as ethernet frames, and a MAC prepend value is prepended to each such frame. The frame generally carries a single higher level "packet", such as an IP packet, and that packet is not segmented. A single packet is not being carried by multiple frames. Accordingly, throughout the rest of this patent document the term "frame" and "packet" are used interchangeably to refer to MAC layer frames, unless the use of the term "packet" in context makes it clear that a different usable of the term is being employed.

Figure 4:
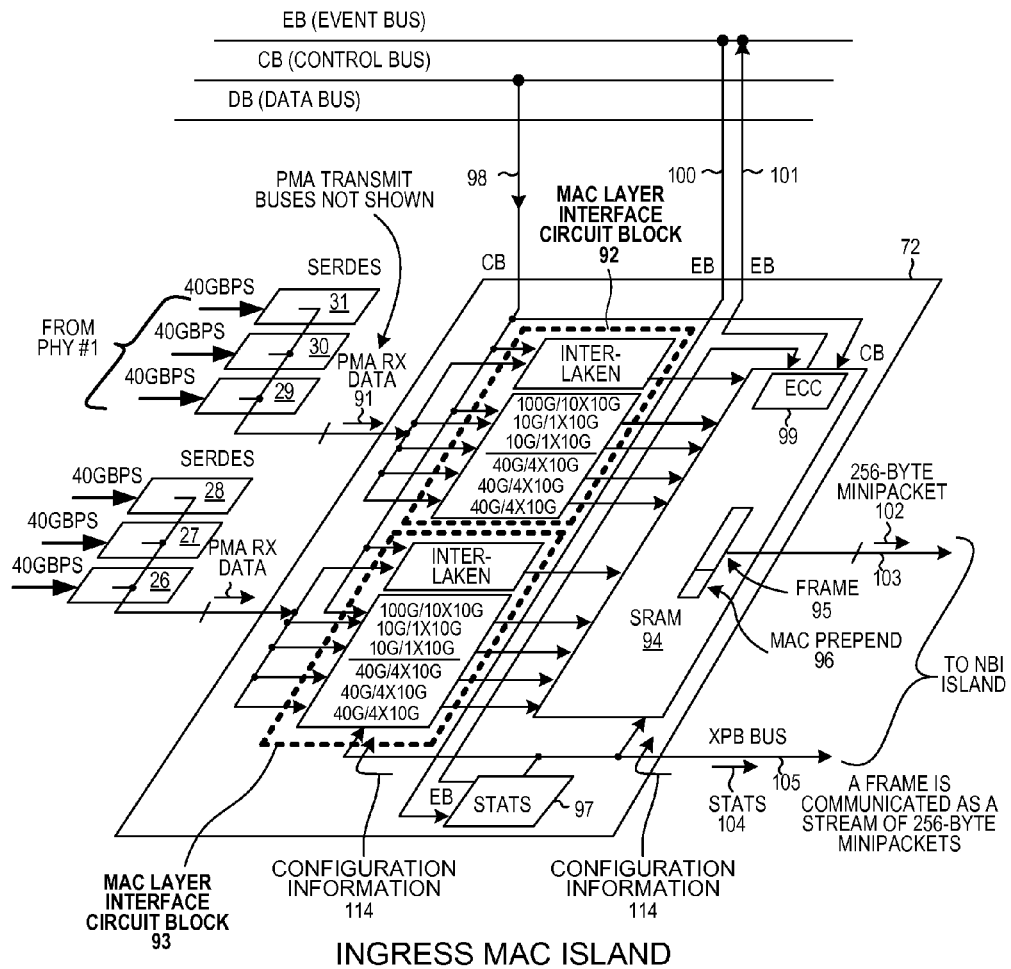
FIG. 4 is a diagram of the ingress MAC island of the NFP integrated circuit of FIG. 2.

FIG. 4 is a more detailed diagram of SerDes circuit blocks 26-31 and ingress MAC island 72.

Figure 5:
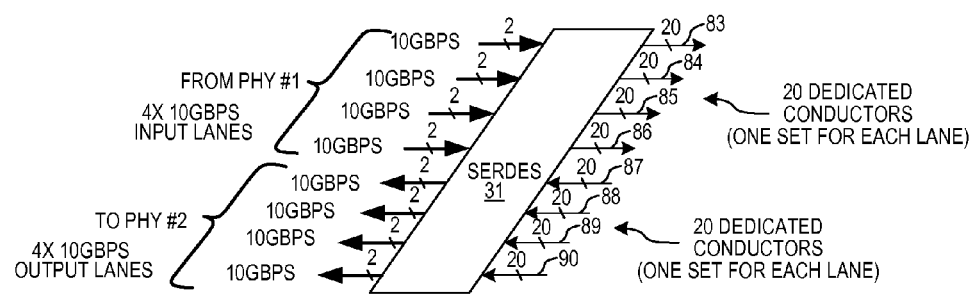
FIG. 5 is a more detailed diagram of one of the SerDes circuits of the NFP integrated circuit of FIG. 2.

FIG. 5 is a more detailed diagram of one of the SerDes circuit blocks, SerDes circuit block 31. All the SerDes circuit blocks are identical. SerDes circuit block 31 has four 20-bit outgoing PMA (Physical Medium Attachment) buses 83-86, and four 20-bit incoming PMA buses 87-90.

The SerDes circuit bocks of FIG. 4 are being used to receive frame data, so the outgoing 20-bit PMA buses are not illustrated in FIG. 4. PMA RX data 91 is converted into frames by MAC layer interface circuit block 92. Blocks 92 and 93 are identical. Each of these blocks actually includes an Interlaken portion and an ethernet portion. MAC layer interface circuit block 92 analyzes the frame data and places the results at the beginning of the frame data in the form of the "MAC prepend" value. The resulting frames and their associated MAC prepend values are then buffered in SRAM 94. Reference numeral 95 identifies a part of a block that represents one frame and reference numeral 96 identifies a part of the block that represents the MAC prepend value. The frame 95 and its MAC prepend value 96 are not stored this way. The illustration of the blocks 95 and 96 is provided for instruction purposes. The MAC prepend value includes: 1) an indication of the length of the frame (packet), 2) an indication whether the frame contains an IP packet, 3) and indication of whether the checksums are correct, and 4) a time stamp indicating when the packet was received.

As such frames are loaded into SRAM 94, a statistics block 97 counts the number of frames that meet certain criteria. Various sub-circuits of the ingress MAC island 72 are configurable. The input conductors 98 labeled CB couples the certain portions of the ingress MAC island to the control mesh bus (CB) so that these portions receive configuration information from the root of control bus tree and configuration PROM 14. SRAM block 94 includes error detection and correction circuitry (ECC) 99. Error information detected and collected by ECC block 99 and statistics block 97 is reported through a local event bus and a global event chain back to the ARM island 52 by the event bus mesh. Ingress MAC island 72 is coupled to part of one of the local event rings. Event packets are circulated into the MAC island via conductors 100 and are circulated out of the MAC island via conductors 101.

Frames that are buffered in SRAM 94 are then output from the ingress MAC island 72 to the ingress NBI island 73 in the form of one or more 256-byte minipacket transactions 102 communicated across dedicated minipacket bus connections 103. The minipacket bus is a private bus used to transport this frame information from the MAC island to the NBI island. Each minipacket bus transaction consists of: 1) 256 bytes of frame data, or the remaining amount of data for the frame, whichever is less, and the MAC prepend. The MAC prepend includes: 1) a virtual channel number to which this frame data belongs, 2) a SOF (Start of Frame) bit indicating if the 256 bytes of frame data is the first piece of a frame for this virtual channel, 3) an EOF (End of Frame) bit that indicates whether the 256 bytes of frame data is the last piece of a frame for this virtual channel. Statistics information 104 is also communicated to the ingress NBI island 73 via a separate XPB bus 105.

Figure 6:
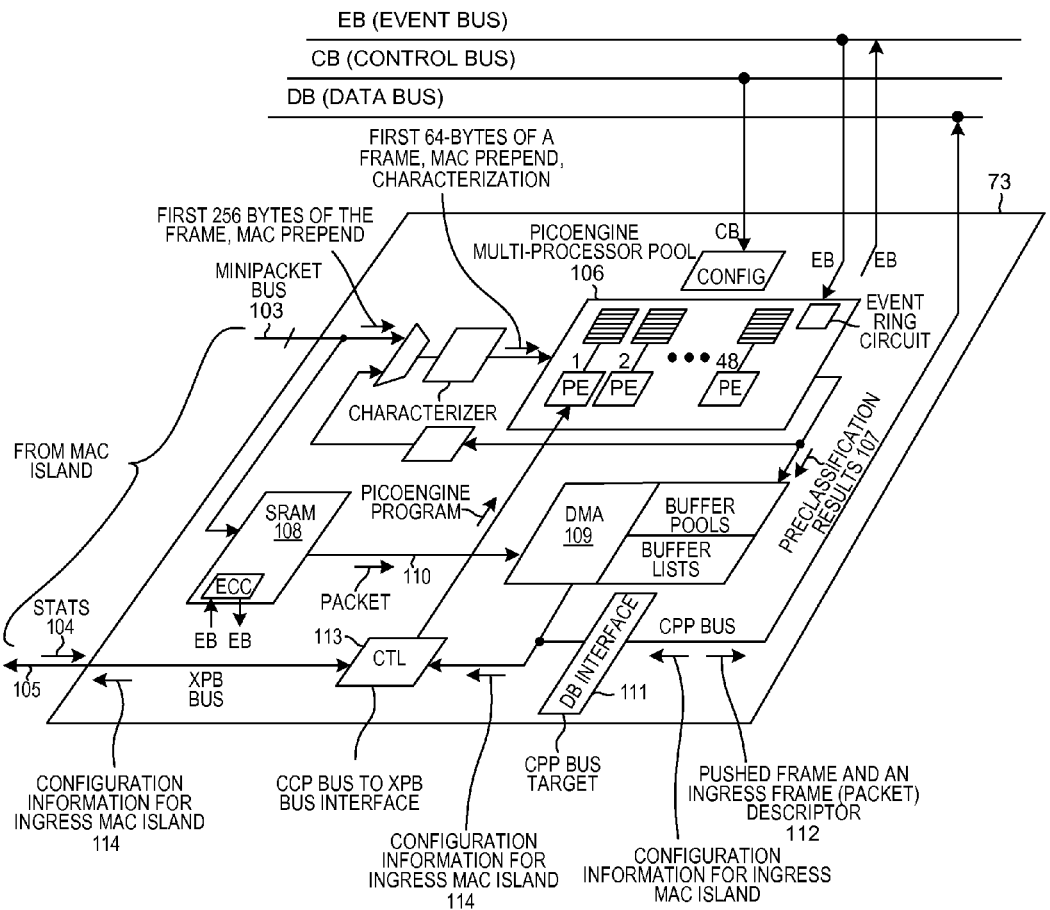
FIG. 6 is diagram of the ingress NBI island of the NFP integrated circuit of FIG. 2.

FIG. 6 is a diagram of ingress NBI island 73. Ingress NBI island 73 receives the MAC prepend and the minipacket information via dedicated minipacket bus connections 103 from the ingress MAC island 72. The first 256 bytes of the frame and the MAC prepend pass through multiplexing circuitry and are analyzed by a pool 106 of forty-eight picoengines. Pool 106 generates preclassification results 107. The preclassification results 107 include: 1) a determination of which one of multiple buffer pools to use to store the frame, 2) a sequence number for the frame in a particular flow of frames through the NFP integrated circuit, and 3) user metadata. The user metadata is typically a code generated by the picoengine pool 106, where the code communicates certain information about the packet. In one example, the user metadata includes a bit that indicates whether the frame was determined by the picoengine pool 106 to be a first type of frame (an exception frame or packet), or whether the frame was determined to contain a second type of frame (a fast-path frame or packet). The frame is buffered in SRAM 108. A buffer pool is a set of targets in ME islands where header portions can be placed. A buffer list is a list of memory addresses where payload portions can be placed. DMA engine 109 can read the frame out of SRAM 108 via conductors 110, then use the buffer pools to determine a destination to which the frame header is to be DMA transferred, and use the buffer lists to determine a destination to which the frame payload is to be DMA transferred. The DMA transfers occur across the configurable mesh data bus. In the case of an exception packet, the preclassification user metadata and buffer pool number indicate to the DMA engine 109 that the frame is an exception frame and this causes a first buffer pool and a first different buffer list to be used, whereas in the case of a fast-path frame the preclassification user metadata and buffer pool number indicate to the DMA engine that the frame is a fast-path frame and this causes a second buffer pool and a second buffer list to be used. CPP bus interface 111 is a CPP bus target. CPP bus interface 111 is CPP bus interface through which the configurable mesh data bus in accessed. Arrow 112 represents frames (packets) that are DMA transferred out of the ingress NBI island 73 by DMA engine 109 and through CCP bus interface 111. Each frame (packet) is output with a corresponding ingress packet descriptor. An ingress packet descriptor includes: 1) an address indicating where and in which ME island the header portion is stored, 2) an address indicating where and in which MU island the payload portion is, 3) how long the frame is, 4) a sequence number for the flow to which the frame belongs, 5) user metadata.

Configuration data can be written by a master on the CPP data bus (DB), through DB interface 111, through CPP-to-XPB bus interface 113, across the XPB bus 105, and into the ingress MAC island 72. Arrows 114 in FIG. 6 and in FIG. 4 represent this configuration information. As described in further detail below, this configuration information 114 configures the MAC layer interface circuit blocks 92 and 93 so that the blocks 92 and 93 together with the SerDes circuits 26-31 are partitioned into and configured into a configurable number of "physical MAC ports". Also, as described in further detail below, this configuration information 114 also: 1) configures block 94 to support a configurable number of "virtual channels", 2) configures how block 94 performs PCP mapping, 3) configures how block 94 performs PCP flow merging, 4) configures how block 94 performs PCP flow reordering, 5) configures how block 94 performs inverse PCP remapping for PFC pause frame generation.

After the picoengine pool 106 in the ingress NBI island 73 has done its analysis and generated its preclassification results for the packet, the ingress NBI island then DMA transfers the frame headers (packet headers) and associated preclassification results across the CPP configurable mesh data bus DB and into the ME island 67. Within the ME island 67, one or more microengines then performs further processing on the header and preclassification results as explained in further detail in U.S. patent application Ser. No. 13/399,888, entitled "Island-Based Network Flow Processor Integrated Circuit", filed Feb. 17, 2012, by Stark et al. (the entire subject matter of which is hereby incorporated by reference).

Figure 7:
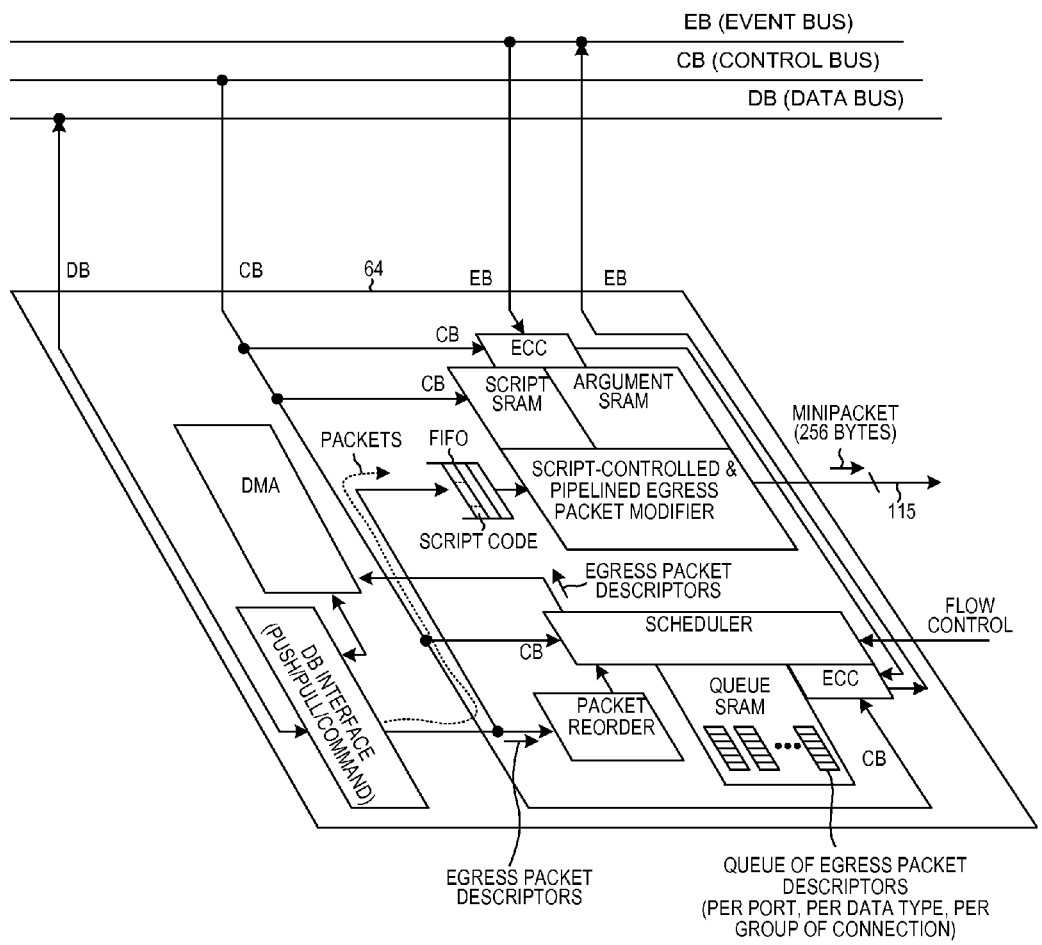
FIG. 7 is diagram of the egress NBI island of the NFP integrated circuit of FIG. 2.

FIG. 7 is a diagram of egress NBI island 64. As illustrated by the arrows of FIG. 3, header and control information passes from the ME island 67 to the NBI island 64, and packet data passes from where it is stored (either SRAM 52 or external DRAM 19-20) to the egress NBI island 64. From the egress NBI island, packet data passes across a minipacket bus 115 to the egress MAC island 65.

Figure 8:
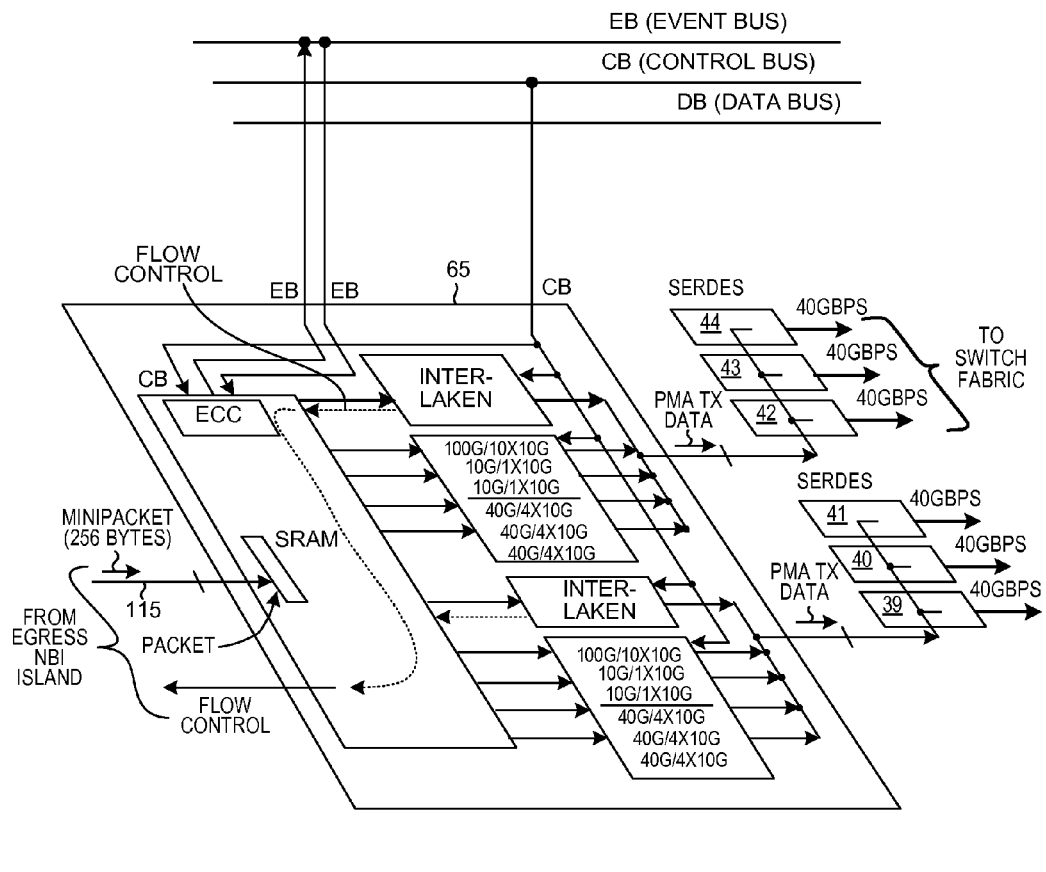
FIG. 8 is a diagram of the egress MAC island of the NFP integrated circuit of FIG. 2.

FIG. 8 is a diagram of egress MAC island 65. In the presently described example, the packet traffic discussed in connection with FIG. 3 flows out of the egress MAC island 65 and through three SerDes circuits 42-44 to the switch fabric 6. Although the ingress MAC island 72 is illustrated in FIG. 4 as having only ingress circuitry, and although the egress MAC island 65 is illustrated in FIG. 8 as having only egress circuitry, both MAC islands are actually identical and each of the two islands has both ingress and egress circuitry. Ingress MAC island 72 can output packet traffic via the same three SerDes circuits 29-31 to optical cable 8. Egress MAC island 65 can receive packet traffic via the same three SerDes circuits 42-44 from switch fabric 6.

Figure 9:
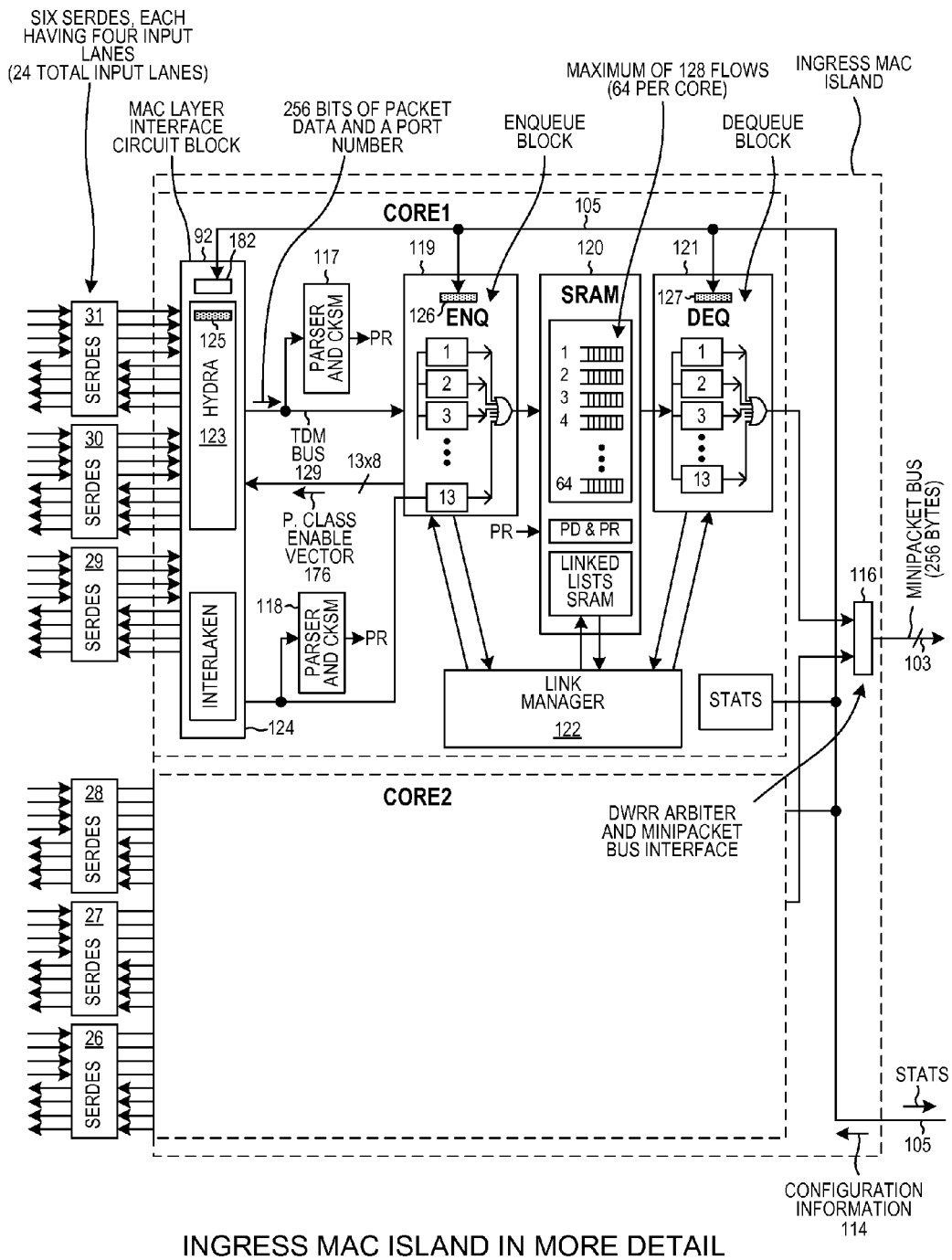
FIG. 9 is a more detailed diagram of CORE1 of the ingress MAC island.

FIG. 9 is a more detailed block diagram of the ingress MAC island 72. Ingress MAC island 72 includes two cores, referred to here as CORE1 and as CORE2, and a DWRR (Deficit Weighted Round Robin) arbiter and minipacket bus interface 116. The two cores are structurally identical. As illustrated in FIG. 9, the SRAM block 94 of FIG. 4 actually includes much more circuitry than just SRAM circuitry. The SRAM block 94 of FIG. 4 actually includes the parser and checksum circuitry of the two cores, the port enqueue circuitry of the two cores, the SRAMs of the two cores, the port dequeue circuitry of the two cores, and the link manager circuit of the two cores, along with the common DWRR arbiter and minipacket bus interface 116. The two parser and checksum circuits of CORE1 are identified in FIG. 9 by reference numerals 117 and 118. The port enqueue circuitry of CORE1 is identified in FIG. 9 by reference numeral 119. The SRAM of CORE1 is identified in FIG. 9 by reference numeral 120. The port dequeue circuitry of CORE1 is identified in FIG. 9 by reference numeral 121. The link manager circuit of CORE1 is identified in FIG. 9 by reference numeral 122. Three of the six SerDes circuits that work with the ingress MAC island are coupled to CORE1, whereas the other three are coupled to CORE2. MAC layer interface circuit block 92 has an Ethernet MAC portion 123 and an InterLaken MAC portion 124. The Ethernet MAC portion 123 of block 92, in one example, is a commercially available IP core of the "Hydra" family, referred to as "Multi-Channel/Multi-Rate 12 Lane 1/10/40/100G Ethernet MAC/PCS Core", ordering code: MTIP-H12LANE1040100-langtech, available from MorethanIP GmbH, Muenchner Strasse 199, D-85757 Karlsfeld, Germany.

Based on configuration information 114, the Ethernet MAC portion 123, along with SerDes circuits 29-31, is configured into a desired number of "physical MAC ports". The Ethernet MAC portion 123 includes a configuration register 125 that is loaded with configuration information 114 for this purpose. Translation circuit 182 translates XPB bus communications into communications understood by the Ethernet MAC portion 123. The port enqueue circuitry 119 includes thirteen port enqueue engines. The port enqueue engines are labeled one through thirteen in the diagram of FIG. 9. The configuration register 126 of the port enqueue circuitry 119 is loaded with configuration information 114 such that one port enqueue engine is assigned to each of the physical MAC ports. Likewise, the port dequeue circuitry 121 includes thirteen port dequeue engines. The port dequeue engines are labeled one through thirteen in the diagram of FIG. 9. The configuration register 127 of the port dequeue circuitry 121 is loaded with configuration information 114 such that one port dequeue engine is assigned to each of the physical MAC ports.

In one example, ethernet frames are received on each of the physical MAC ports. Frame data of such an ethernet frame is output, 256 bits at a time, onto TDM (Time Division Multiplexed) bus 129. Each such 256-bit amount of packet data is accompanied by: 1) a value that indicates the physical MAC port that received the packet data, 2) a SOF (Start of Frame) bit that if asserted indicates that the 256-bit amount of packet data carries the first packet data of a frame, 3) an EOF (End of Frame) bit that if asserted indicates that the 256-bit amount of packet data carries the last packet data of a frame, 4) an error bit ERR, 5) a 5-bit MOD value that is valid if EOF is asserted and in that case indicates how many bytes of the 256-bit value are valid, 6) a port number, and 7) a timestamp that is valid if SOF is asserted. This additional information about the 256-bit amount of packet data is generated by the Ethernet MAC portion 123 of the MAC layer interface circuit 92. These 256-bit values along with their accompanying descriptive information are supplied one after another, in time division multiplexed fashion, from the various physical MAC ports onto TDM bus 129.

A 256-bit value is supplied to parser and checksum circuit 117, and is also supplied to the port enqueue circuitry 119. One of the port enqueue engines of the port enqueue circuitry 119 is hardcoded with the number of the physical MAC port. Each such port enqueue engine receives the physical MAC number and determines, using its hardcoded number, if the 256-bit value is for the port handled by the port enqueue engine. The proper port enqueue engine (the one whose hardcoded number matches the port number of the incoming 256-bit value) receives the 256-bit value, and loads the value into a buffer for the appropriate one of virtual channels. The buffer is in SRAM 120. Eight such 256-bit writes are required to fill the buffer. The port enqueue engine operates atomically, one frame at a time, loading buffers with frame data from SOF to EOF, to a single channel. The Ethernet MAC portion 123 (the "Hydra") presents 256-bit frame data for each port atomically. Frame data for multiple ports may be interleaved on the TDM bus (e.g., Port 1 SOF, Port 2 SOF, . . . , Port 1 EOF, Port 2 EOF), but each enqueue engine only takes the data for its assigned port, so each enqueue engine reads frames atomically. At the time of loading the last 256-bit word of a frame, the parser and checksum circuit 117 has finished generating the "parser result" (PR) value. The PR value is then into a "PD and PR Memory" 131 in the SRAM 120, where the result value (PR) written is stored so that it is indexed by the buffer ID of the first buffer that stores the first 256-bit value of the frame. In addition to the parse result (PR) value, the timestamp value is also written into this "PD and PR Memory" 131, indexed to the buffer ID of the first buffer that stores the first 256-bit value of the frame.

When the last 256-bit value has been written into a buffer such that the buffer is full, a buffer ID for the buffer is added to a linked list for the virtual channel. This linked list stores the buffer IDs of the buffers that store the frame data. As buffer IDs are stored into the linked list, the associated frame data is said to be pushed into the linked list of buffers. In the illustration of FIG. 9, there are sixty-four linked lists of buffers, where there is one linked list of buffers for each of a maximum sixty-four corresponding virtual channels. The ingress MAC island is configured to provide one linked list of buffers for each virtual channel through the NFP integrated circuit from the optical fiber 7 to the switch fabric 6 in this example. The ingress MAC island supports a maximum of 128 virtual channels, with each core supporting a different set of sixty-four virtual channels. A frame received via a physical MAC port can have an IEEE 802.1Q PCP (Priority Code Point) value from zero to seven. The frames received on a particular physical MAC port having a particular PCP value are referred to here as a "PCP flow". Each of the eight possible PCP flows received onto a given physical MAC port can be assigned to a different one of eight linked lists of buffers for eight corresponding virtual channels, such that there is a one-to-one correspondence between PCP flows and virtual channels. Alternatively, multiple ones of the PCP flows coming into a given physical MAC port can be merged so that the frames of these merged flows are all stored into the same linked list of buffers for the same one virtual channel. Even though PCP flows may be merged and stored in the same virtual linked list of buffers, the buffers for frames are stored (in the linked list of buffers for the virtual channel) so that frames are stored atomically, one after the other. The link manager 122 handles head pointer and tail pointer maintenance for the linked lists. The link manager 122 also manages a link list of buffers, where the buffers are free buffers. For each virtual channel, the link manager 122 also maintains a buffer count and a packet count. The buffer count indicates the number of buffers that are in the linked list of buffers for the virtual channel. The packet count indicates the number of complete packets (i.e., frames) that are stored in the linked list of buffers for the virtual channel. A frame (or packet) that is stored in such a linked list of buffers in SRAM 120 is said to be buffered in the SRAM.

The port dequeue circuitry 121 dequeues the linked lists of buffers for the virtual channels and supplies the frame data, one buffer at a time, to the DWRR arbiter and minipacket bus interface 116. The DWRR arbiter and minipacket bus interface 116 in turn outputs 256-byte minipackets, out of the ingress MAC island 72 via minipacket bus 103.

Each port dequeue port engine examines the frame counts for the virtual channels that are receiving frames from the physical MAC port associated with the port dequeue engine. There is one port dequeue engine for each physical MAC port, which handles all the channels for that physical MAC port. Accordingly, the port dequeue engine for the first physical MAC port examines the frame counts for the linked lists that store frame data for PCP flows received onto the first physical MAC port. The various port dequeue engines that determine that their linked lists have at least one complete frame to dequeue then arbitrate with the DWRR arbiter and minipacket bus interface 116 to read the SRAM 120, and one is granted permission to dequeue buffers. If, for that selected port dequeue engine, there are linked lists for more than one virtual channel that are indicated (by their frame counts) to have at least one frame stored, then a local arbiter within the selected port dequeue engine selects one of the virtual channels to be dequeued. The selected port dequeue engine then dequeues buffers for one frame (dequeues this frame atomically) from the SRAM frame memory for the selected virtual channel. At the time the first buffer of a frame is dequeued, the packet descriptor (PD) (for that frame) is also automatically read by the port dequeue engine via the link manager. The term "packet descriptor" is used here, even though the descriptor is perhaps more accurately referred to as a "frame descriptor". The packet descriptor (PD) was stored indexed to the buffer ID of the first buffer that stores the first part of the frame, so the packet descriptor (PD) can be read from memory at this time. The packet descriptor was generated, and caused to be stored in the PD and PR memory, by the particular port enqueue engine that enqueued to associated frame. The packet descriptor (PD) contains a number that indicates the numbers of buffers that store the frame, and also contains a number of bytes in the last buffer that marks the end of the frame. This packet descriptor (PD) information is generated the port enqueue engine. Together these two values indicate how many 256-bit reads the port dequeue engine must perform on the linked list of buffers until one entire frame has been atomically read. After reading the first 256-bit value and the packet descriptor, the port dequeue engine then goes on to read subsequent 256-bit values, one by one, from subsequent buffers of the same linked list of buffers, and these 256-bit values are supplied to the DWRR arbiter and minipacket bus interface 116 to read the SRAM 120.

As indicated above, the DWRR arbiter and minipacket bus interface 116 outputs the data in 256-byte minipackets. When the last valid word of a buffer has been read, then the DWRR arbiter 116 arbitrates again and selects another port dequeue engine. The DWRR arbiter and minipacket bus interface 116 is a 26-slot arbiter with programmable weights. The weights are in bytes. When a port is arbitrating and is credit-positive and wins a grant, then the arbiter deducts 512 bytes from the port's credits. The port can then output up to 512 bytes. Once the buffer transfer ends and the remaining transfer credits of the 512 bytes is less than 512 bytes, the port dequeue engine will cause the arbiter's port credit count to be updated with the unused remaining credits of the original 512 bytes. When no port dequeue engines are arbitrating, or when all the port dequeue engines have negative credit, the arbiter credit counts are refreshed to the original allotment. By programming all the ports to an equal initial weight, the dequeue bandwidth is evenly distributed across the arbitrating ports.

Figure 10A:
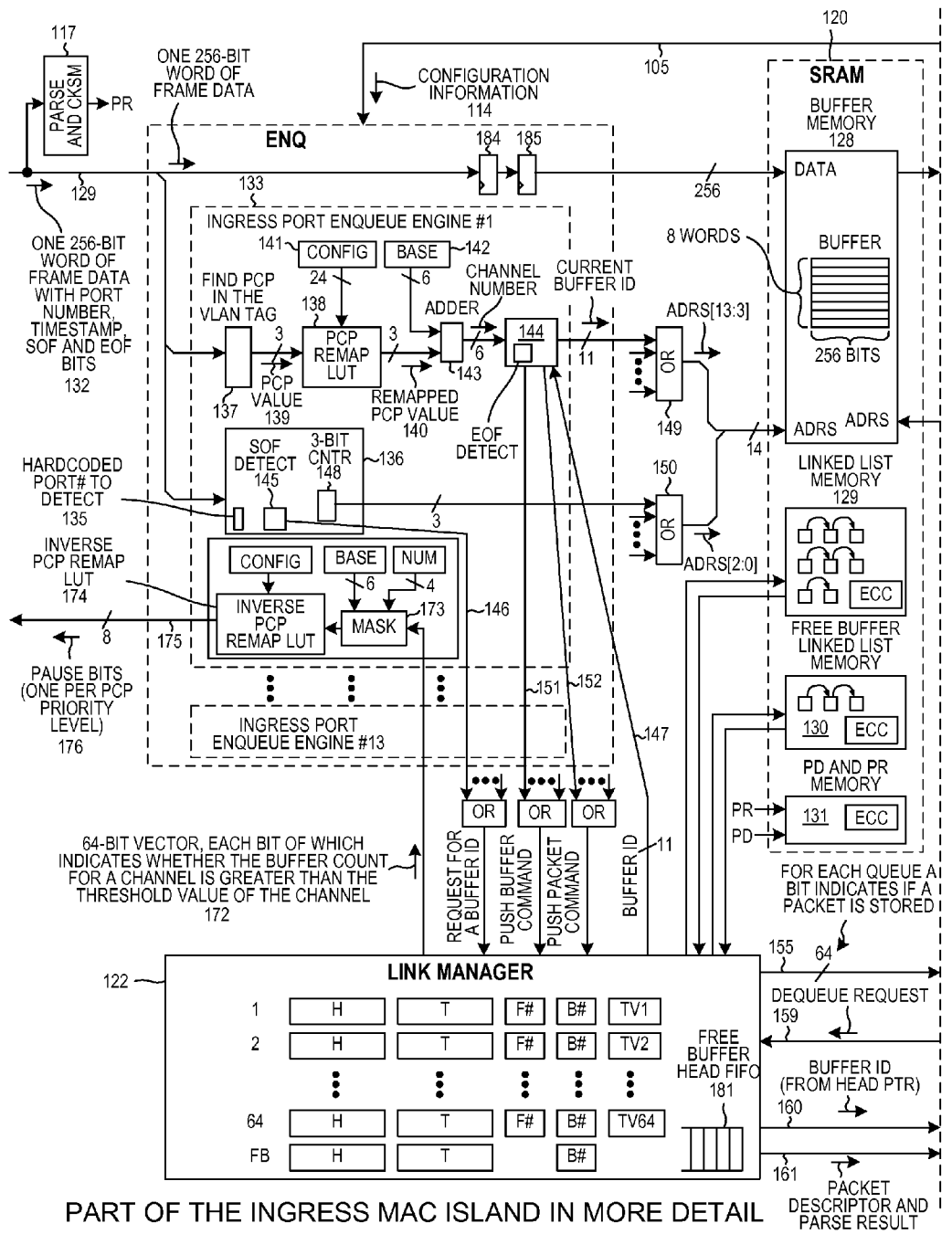
FIG. 10A is the left half of a larger FIG. 10.
Figure 10B:
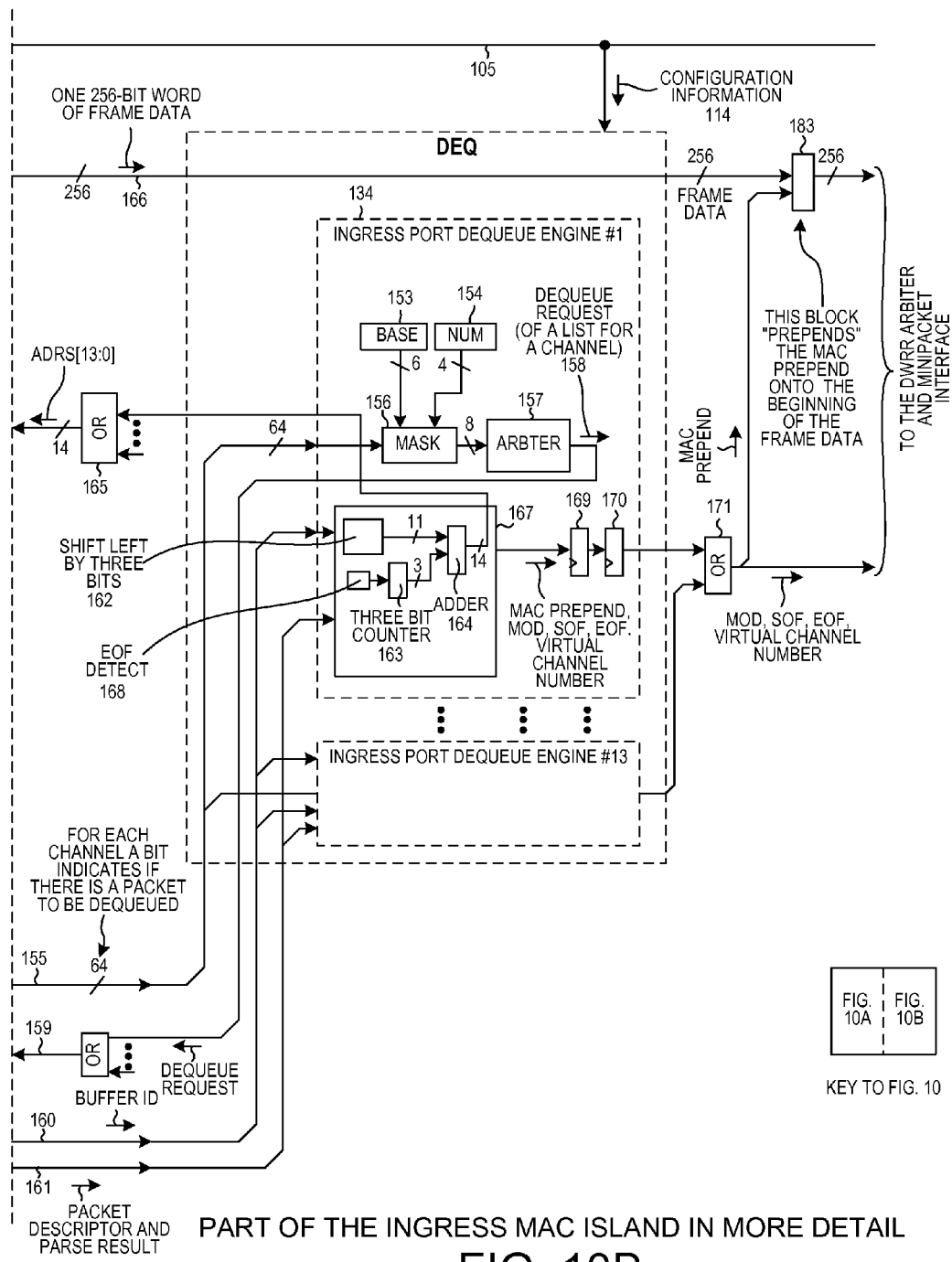
FIG. 10B is the right half of a larger FIG. 10.

FIG. 10A and FIG. 10B together form a single larger FIG. 10. FIG. 10 is a more detailed diagram of the port enqueue circuitry 119, the SRAM 120, the port dequeue circuitry 121, and the link manager 122 of FIG. 9. SRAM 120 actually is a collection of multiple separately accessible memories: the buffer memory 128, the linked list memory 129, the free buffer linked list memory 130, and the PD (Packet Descriptor) and PR (Parse Result) memory 131. Each buffer in buffer memory 128 is eight words, of 256 bits for each word. The buffer memory 128 is read and written one 256-bit word at a time. Any buffers that are not being used to store frame data are referred to as "free". A pointer to each of these free buffers is maintained in a "free buffer linked list" in the free buffer linked list memory 130. The link manager 122 can pop the free buffer linked list, thereby obtaining a buffer ID that points to a free buffer in the buffer memory 128. This buffer ID can then be used to write frame data into the corresponding buffer that was free. When data is written into the buffer, the buffer is no longer "free". When the buffer has been filled, its buffer ID is pushed onto the appropriate one of the linked lists in linked list memory 129. For each virtual channel, there is one linked list of buffers, and the buffer IDs of these buffers are stored in a corresponding linked list in the linked list memory. In an enqueue operation, when frame data is to be written into the linked list of buffers for a particular virtual channel, the link manager 122 can push the buffer ID of the now-used buffer onto the linked list for the virtual channel. The link manager 122 pops the free buffer list, thereby obtaining a buffer ID for another buffer to be used to store the next amount of frame data. In a dequeueing operation, the link manager 122 can pop the appropriate linked list, and obtain the next buffer ID of the next buffer to be read (for a given virtual channel). Once the frame data has been read out of that buffer, the buffer ID for that buffer is pushed onto the free buffer linked list. The link manager 122 handles the pushing and popping from the various linked lists, and does so in response to requests and commands from the port enqueue engines and port dequeue engines.

As described above, for each complete frame stored in a linked list of buffers, the "PD and PR memory" 131 stores a packet descriptor (PD) value and a parse result (PR) value, where these PD and PR values are stored indexed to the buffer ID of the buffer that stores the first part of the packet. Upon enqueueing the buffer that stores the last frame (EOF) data for a frame, the packet descriptor (PD) and parse result (PR) is written into the PD and PR memory 131. Each of the port enqueue engines has a set of PD output conductors that are coupled to inputs of an OR gate structure, where the output of the OR gate structure is supplied to the PD and PR memory. Because only one of the port enqueue engines can drive a non-zero PD value at a given time, the active port enqueue engine outputs the packet descriptor (PD) that passes through the OR gate structure. The supplying of the packet descriptor onto the inputs of the PD and PR memory results in writing of the PD into the memory. Upon dequeueing the buffer that stores the first frame data of a frame, the packet descriptor (PD) is read from the PD and PR memory 131 and is supplied to all the port dequeue engines at the same time in parallel. Only the appropriate active port dequeue engine, however, latches in the packet descriptor.

How a 256-bit value from the TDM bus 129 is processed by a port enqueue engine 133 and a port dequeue engine 134 is now described in reference to FIG. 10. The 256-bit value 132 is received on conductors 129, along with a port number, an error bit ERR, five MOD bits (if EOF is asserted then these bits are valid and indicate how many bytes are valid in this 256-bit value), a timestamp, an SOF bit (if this bit is asserted then this 256-bit value contains the first part of the frame), and an EOF bit (if this bit is asserted then this 256-bit value contains the last part of the frame).

The parse and checksum circuit 117 begins analyzing such 256-bit values for a frame, and when the EOF 256-bit value has been received and processed, the parse and checksum circuit 117 supplies the parse result to the PD and PR memory 131. The parse result PR is written into the PD and PR memory 131 at that time.

Port enqueue engine 133 has circuitry 135 that is hard-coded with a port number. In the presently described example, the circuit 136 uses this hardcoded value to determine whether the port number of the incoming 256-bit value matches the hardcoded value. For a given 256-bit value, if there is a match the port enqueue engine 133 processes the 256-bit value, otherwise the port enqueue engine 133 takes no action. Where there is a match, circuit 137 extracts the PCP value 139 from the MAC header of the frame. The 3-bit PCP value 139 is supplied to PCP Remap Lookup Table (PRLUT) circuit 138, that in turn outputs a remapped 3-bit value 140. The PRLUT circuit 138 is a LUT that has eight three-bit entries, one entry for each 3-bit PCP value. The configurable contents of the PRLUT circuit 138 is provided by configuration register 141. PRLUT circuit 138 is a set of 3-bit loadable registers and an associated set of three 8:1 output multiplexers, where the select inputs of the output multiplexers are controlled by the 3-bit PCP value, and where the data outputs of the multiplexers output the 3-bit remapped PCP value 140. The remapped PCP value 140 is then added by an adder 143 to a 6-bit base value supplied by a base register 142. The resulting 6-bit sum is a virtual channel number. The PCP remapping circuitry 137, 138, 143, 141 and 142 is preconfigured high-speed combinatorial logic circuitry that generates virtual channel numbers and that includes no processor that fetches or executes any instruction.

If a SOF is indicated by SOF detector 145, then circuit 136 issues a request for a buffer ID from the link manager 122. This request is communicated via conductors 146, and through an OR gate structure, to the link manager 122. Only one port enqueue engine can output a non-zero request (request for a buffer ID) at a time, so the request passes through the OR gate structure and to the link manager. In response, the link manager 122 pops the head of the free buffer linked list, thereby obtaining a buffer ID of a free buffer, and forwards the buffer ID to the port enqueue engine 133 via conductors 147. The conductors 147 extend to each of the port enqueue engines, but only the active port enqueue engine latches in the buffer ID value. The active port enqueue engine 133 thereafter uses the buffer ID to write into SRAM 120. This buffer ID identifies the beginning of an 8-word by 256-bit buffer. As each successive 256-bit word is written, the least significant three bits of the value ADRS[13:0] are incremented due to the incrementing of 3-bit counter 148. For each such 256-bit value received onto the port enqueue engine 133, the 3-bit counter 148 increments, and this incrementing results in the next 256-bit value being written into the next word of the buffer. Only the port enqueue engine that is active can output a non-zero address value. The OR gate structures 149 and 150 therefore pass the non-zero address value from the one active port enqueue engine onto the ADRS[13:0] address lines of the SRAM memory. When a buffer has been filled, then the port enqueue engine 133 issues a push buffer command via conductors 151 to the link manager 122 along with a virtual channel number. The link manager 122 handles pushing the buffer ID onto the linked list for the indicated virtual channel. For each linked list, the head pointer queue element and the tail pointer queue element of the linked list are present in the link manager 122, whereas any additional queue elements of the linked list are stored in linked list memory 129. For the free buffer linked list, the additional queue elements are stored in the free buffer linked list memory 130. As buffers are filled and as buffer IDs are pushed onto a linked list for a virtual channel, a buffer count for the link list is incremented. The buffer count values are labeled "B#" in FIG. 10. Similarly, when the last 256-bit value of a frame has been loaded into the buffer memory, then a frame count value for the linked list is incremented. The frame count values are labeled "F#" in FIG. 10.

When EOF is asserted (indicating the last write to the last buffer storing the frame), and the last buffer ID of the frame has been pushed onto the appropriate linked list for a virtual channel, then the port enqueue engine 133 causes the link manager 122 to write a packet descriptor (PD) into the "PD and PR memory" 131 by issuing a push packet command to the link manager 122 via conductors 152 and an OR gate structure. Again, only one port enqueue engine can output a non-zero push packet command, the push packet command output by the active port enqueue engine passes through the OR gate structure to the link manager 122. The push packet command includes the buffer ID of the first buffer storing data for the frame, so that the packet descriptor (PD) will be stored indexed to this buffer ID.

After the port enqueue engine 133 receives a 256-bit value, there is a fixed number of clock cycles before the ADRS[13:0] address value will be presented to the SRAM 120. Pipeline registers 184 and 185 are provided to delay the 256-bit data value the appropriate amount so that the correct 256-bit data value will be written into SRAM 120. The base number BASE stored in base register 142 sets the base virtual channel number used by the port enqueue engine. If the port enqueue engine loads buffers for multiple virtual channels, then the virtual channel numbers of these virtual channels have incremental offsets from the base virtual channel number. These virtual channel numbers are a block of virtual channel numbers, whose base virtual channel number value is set by the contents of the base register 142.

Those linked lists of buffers, the virtual channels of which are assigned to a physical MAC port, are dequeued by a port dequeue engine. There is one port dequeue engine assigned to handle each physical MAC port. In FIG. 10, port dequeue engine 134 is the dequeue engine for same physical MAC port to which the port enqueue engine 133 is assigned. The BASE content of base register 153 sets a base virtual channel number, and the NUM content of num register 154 defines a number of virtual channel numbers in a block of virtual channel numbers. These virtual channel numbers indicate the virtual channels, the linked lists of buffers for which the port dequeue engine is responsible. By writing appropriate BASE and NUM values into the base and num registers, the port dequeue engine is configured to dequeue the corresponding linked lists of buffers. A 64-bit vector is output from the link manager 122 via conductors 155, where each respective bit in the 64-bit vector indicates whether the frame count (also called packet count) of a corresponding one of the sixty-four linked lists is a non-zero value. A bit being set indicates that the corresponding linked list stores at least one complete packet (one complete frame). The mask circuit 156 in the port dequeue engine 134 uses the BASE and NUM values from registers 153 and 154 to examine those bits in the 64-bit vector that pertain to the linked lists that the port dequeue engine 134 is responsible for dequeueing. If more than one of these bits is set, then a local "arbiter and dequeue request generator" 157 selects one of the corresponding virtual channels. A dequeue request 158 to dequeue the linked list of buffers for the selected virtual channel is supplied via an OR gate structure and conductors 159 to the link manager 122. The dequeue request includes a virtual channel number. In response to the dequeue request, the link manager returns the buffer ID of the appropriate linked list. The buffer ID is returned to the port dequeue engine 134 via conductors 160. If the indicated buffer is the buffer that stores the first part of a frame, then the PD and PR memory 131 is read, and the packet descriptor (PD) and the parse result (PR) are returned to the port dequeue engine via conductors 161. Within the port dequeue engine, the buffer ID value is shifted by three bits by circuit 162. For each successive read of a word from the buffer, the three-bit counter increments a count value. The sum of the three-bit counter value and the shifted buffer ID value, as output by adder 164, is supplied through OR structure 165 as the address value ADRS[13:0] to the SRAM 120. This address value identifies one of the eight 256-bit words of the appropriate buffer. A few clock cycles later the 256-bit data contents of the addressed buffer are then output via conductors 166. If the 256-bit value is indicated to be the start of frame (SOF), then an SOF bit is asserted by circuit 167. If an EOF circuit 168 determines that the 256-bit word is the last of a frame, based on the "number of buffers for the frame" value and the "bytes in last buffer" value of the packet descriptor, then the circuit 168 asserts an end of frame (EOF) bit. These bits are determined by circuit 167 several clock cycles before the associated 256-bit data value is output by SRAM 120, so a MAC prepend, the MOD bits, the SOF bit and the EOF bit are delayed by pipeline registers 169 and 170. The MAC prepend is derived from the parse result (PR) value received via conductors 161. The value MOD indicates how many bytes are valid in the 256-bit word (in the last word of a frame, only some of the bytes are typically valid). Only one of the port dequeue engines is allowed by the DWRR arbiter 116 to dequeue and to output non-zero values at a time, so the MAC prepend, MOD, SOF and EOF bits pass through OR structure 171. Prepend and merge circuit 183 "prepends" the MAC prepend value onto the front of the first amount of frame data, but nonetheless the prepend and merge circuit 183 outputs information 256 bits at a time. For each 256-bit value that is output, the MOD bits, the SOF bit, the EOF bit, and the virtual channel number as output by OR gate structure 171 are output as sideband signals.

When the last buffer of the frame has been read from SRAM 120, the port dequeue engine 134 releases its request to the DWRR arbiter 166. The DWRR arbiter 166 is then able to arbitrate again among the various port dequeue engines for which port dequeue engine will be permitted to dequeue next. Each port dequeue engine dequeues ethernet frames atomically from the SRAM 120, so once the dequeueing of buffers for a frame has begun, the buffers for that frame continue to be dequeued (when allowed by DWRR arbiter 116) until the last buffer storing data for that frame has been dequeued.

The link manager 122 stores, for each linked list (for each virtual channel), an overflow threshold value. The overflow threshold values are denotes "TV1 through TV64" in FIG. 10. The link manger 122 outputs a 64-bit vector signal 172, each bit of which indicates whether the buffer count for a virtual channel is greater than the overflow threshold value for that virtual channel. This 64-bit vector signal 172 is received in parallel by all the port enqueue engines. A mask circuit in each port enqueue engine uses the BASE and NUM values to identify which bits from the 64-bit vector signal value correspond to virtual channels, the linked lists of buffers of which that particular port enqueue engine are enqueued by that port enqueue engine. As explained above, each port enqueue engine is configured by BASE and NUM to enqueue up to eight virtual channels. The circuitry of one port enqueue engine is described here as an example. In the case of port enqueue engine 133, the 64-bit vector signal 172 is received by mask circuit 173. Mask circuit 173 outputs an indication of all virtual channels that this particular port enqueue engine 133 is responsible for enqueuing. For each such indicated virtual channel, an Inverse PCP Remap LUT (IPRLUT) circuit 174 performs inverse PCP mapping, and outputs the PCP value or values associated with the virtual channel that has exceeded its overflow threshold value. Where multiple PCP flows are merged by PCP remap LUT circuit 138 in the enqueueing process into one virtual channel, that one virtual channel number is inverse mapped back to the multiple PCP values of those PCP flows. The effect of PCP merging and/or PCP reodering performed by the PCP LUT circuit 138 in the enqueueing process is therefore reversed in by the IPRLUT circuit 174. For each PCP value for any of the virtual channels identified by circuits 173 and 174, the corresponding bit in an 8-bit priority class enable vector 176 is set. This priority class enable vector 176 is output via conductors 175 to Ethernet MAC portion 123. There is one such eight-bit set of conductors that extends from each respective port enqueue engine to its corresponding physical MAC port portion of the Ethernet MAC portion 123. For a given physical MAC port portion, the Ethernet MAC portion 123 uses the incoming priority class enable vector 176 (from its corresponding port enqueue engine) to generate a IEEE 802.3x PFC pause frame. The physical MAC port that received the priority class enable vector 176 then sends out the PFC pause frame. The MAC source address of the PFC pause frame is the destination MAC address of the physical MAC port. The MAC destination address is a predefined value.

As in the case of the PCP remapping circuitry 137, 138, 143, 141 and 142 as described above, the inverse PCP remapping circuitry 173 and 174 is an amount of preconfigured high-speed combinatorial logic circuitry that that includes no processor that fetches or executes any instruction.

Figures 11, 12A, 12B, 12C, 12D:
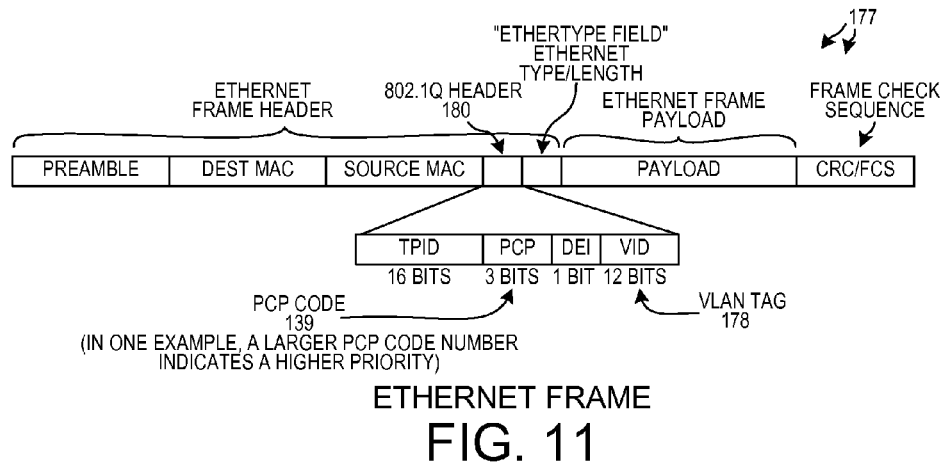
FIG. 11 is a diagram of an ethernet frame that has a VLAN tag and a PCP code field.
FIG. 12A is a diagram that shows how the ingress MAC circuitry of the NFP integrated circuit can be configured into a first set of physical MAC ports.
FIG. 12B is a diagram that shows how the ingress MAC circuitry of the NFP integrated circuit can be configured into a second set of physical MAC ports.
FIG. 12C is a diagram that shows how the ingress MAC circuitry of the NFP integrated circuit can be configured into a third set of physical MAC ports.
FIG. 12D is a diagram that shows how the ingress MAC circuitry of the NFP integrated circuit can be configured into a fourth set of physical MAC ports.

FIG. 11 is a diagram of an ethernet frame 177 that includes a VLAN tag 178 and the 3-bit PCP code 139. The 12-bit VLAN tag and the 3-bit PCP code are parts of an IEEE 802.1Q header 180. This 3-bit PCP code 139 is the PCP value 139 identified by circuit 137 in FIG. 10.

FIG. 12A is a diagram that illustrates one possible configuration of the ingress MAC circuitry of the NFP integrated circuit 9. The MAC interface circuitry and the six SerDes 26-31 are configured into twenty-four 10 Gbps physical MAC ports. In this case, the number of physical MAC ports multiplied by eight (the number of PCP priority levels) exceeds the maximum number of virtual channels supported (sixty-four), so PCP flow merging (using PCP remap LUT circuit 138) as described above is performed.

FIG. 12B is a diagram that illustrates another possible configuration of the ingress MAC circuitry of the NFP integrated circuit 9. The MAC interface circuitry and the six SerDes 26-31 are configured into six 40 Gbps physical MAC ports. The number of physical MAC ports multiplied by eight (the number of PCP priority levels) does not exceed the maximum number of virtual channels supported, so PCP flow merging need not be applied.

FIG. 12C is a diagram that illustrates another possible configuration of the ingress MAC circuitry of the NFP integrated circuit 9. The MAC interface circuitry and the six SerDes 26-31 are configured into two 100 Gbps physical MAC ports and four 10 Gbps physical MAC ports. The number of physical MAC ports multiplied by eight (the number of PCP priority levels) does not exceed the maximum number of virtual channels supported, so PCP flow merging need not be applied.

FIG. 12D is a diagram that illustrates another possible configuration of the ingress MAC circuitry of the NFP integrated circuit 9. The MAC interface circuitry and the six SerDes 26-31 are configured into twelve 10 Gbps physical MAC ports and three 40 Gbps physical MAC ports. The number of physical MAC ports multiplied by eight (the number of PCP priority levels) exceeds the maximum number of virtual channels supported, so PCP flow merging is applied.

FIG. 13 is a diagram that illustrates both PCP flow merging, as well as PCP flow reordering. The PCP remap LUT circuit of the port enqueue engine handling the first physical MAC port "1" is configured so that the PCP flows of PCP codes 101, 110, and 111 are merged so that all their frames are stored into the same linked list of buffers for virtual channel number 000101. Similarly, the PCP remap LUT circuit of the port enqueue engine handling the third physical MAC port "3" is configured so that PCP flows for PCP codes 000, 001, 010, 011, 100, 101 and 110 are all merged so that their frames are all stored into the same linked list of buffers for virtual channel number 001101. The first and third port enqueue engines therefore perform PCP flow merging. The second port enqueue engine that is handling the second physical MAC port "2" recorders PCP flows as they are assigned to virtual channels, but does not perform flow merging. The PCP remap LUT circuit of the second port enqueue engine assigns the PCP flow of PCP code 011 so that its frames are stored into the linked list of buffers for virtual channel number 001010. The PCP remap LUT circuit of the second port enqueue engine assigns the PCP flow of PCP code 100 so that its frames are stored into the linked list of buffers for virtual channel number 001011. The PCP remap LUT circuit of the second port enqueue engine assigns the PCP flow of PCP code 101 so that its frames are stored into the linked list of buffers for virtual channel number 001001. In one example, the larger PCP code values are to indicate higher priority levels, and the higher the virtual channel number (within those virtual channels assigned to the same physical MAC port) the higher the priority, but yet the higher priority PCP flow of PCP code value "101" is assigned to a virtual channel of lower priority that are the PCP flows for PCP code values "011" and "100". Higher virtual channel numbers of a physical MAC port generally correspond to higher priority, but this need not be so. The relative priorities of the virtual channels is actually determined by packet processing functionality downstream of the ingress MAC island.

Figures 14, 15, 21:
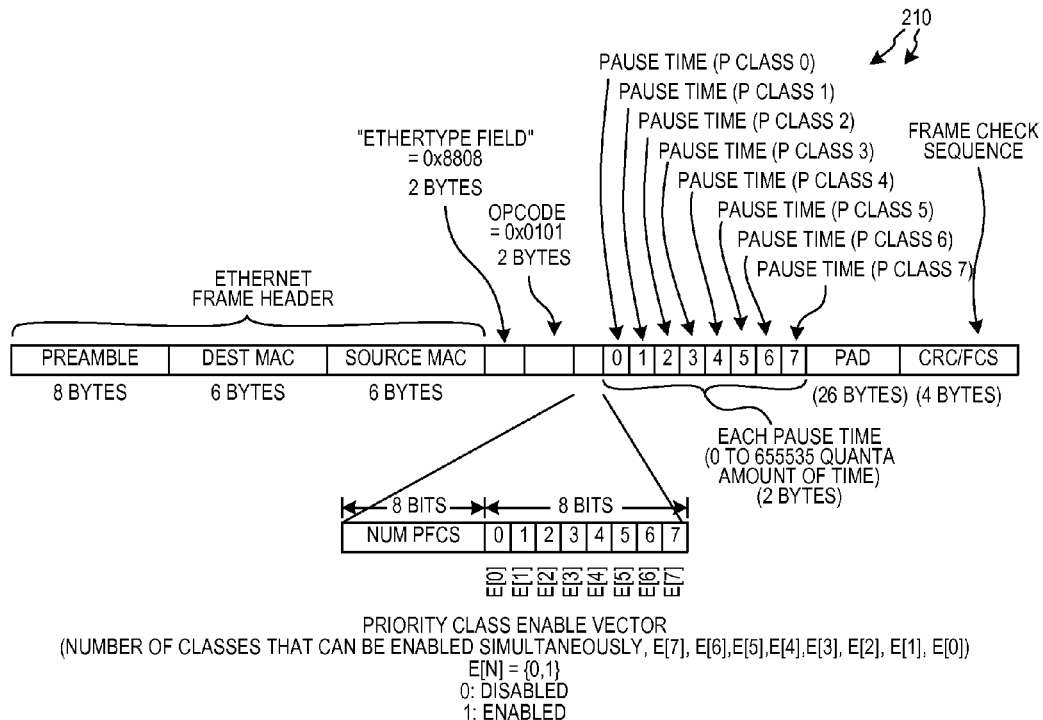
FIG. 14 is a diagram that illustrates the contents of the PCP remap LUT circuit of the first port enqueue engine that handles the first physical MAC port, for the example of FIG. 13.
FIG. 15 is a diagram that illustrates the contents of the PCP remap LUT circuit of the second port enqueue engine that handles the second physical MAC port, for the example of FIG. 13.
FIG. 21 is a diagram of a PFC pause frame that is generated as a result of inverse PCP remapping in an overload condition in accordance with a fourth novel aspect.

FIG. 14 is a diagram that illustrates the configuration information stored in the PCP remap LUT circuit of the first port enqueue engine (the one handling the first physical MAC port), for the example of FIG. 13. There are eight 3-bit words stored. The contents of the eight table locations of the PCP remap LUT are the values in the right column. The 3-bit address values that point to those table location are indicated in the left column.

FIG. 15 is a diagram that illustrates the configuration information stored in the PCP remap LUT circuit of the second port enqueue engine (the one handling the second physical MAC port), for the example of FIG. 13. There are eight 3-bit words stored. The contents of the eight table locations of the PCP remap LUT are the values in the right column. The 3-bit address values that point to those table locations are indicated in the left column.

Figure 16:
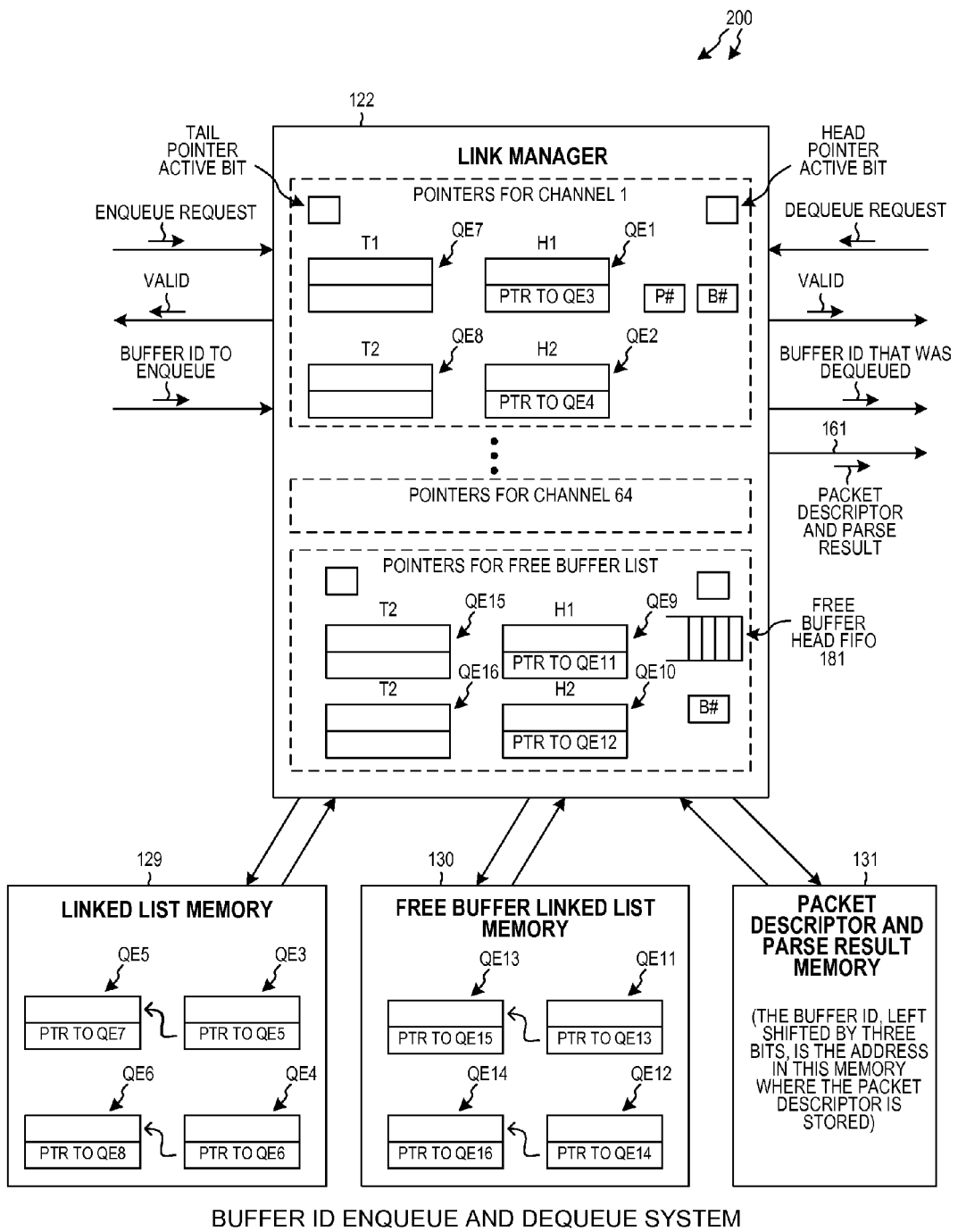
FIG. 16 is a diagram of a dual linked list system in accordance with a third novel aspect.

FIG. 16 is a diagram that illustrates operation of a dual linked list system 200 involving link manager 122, linked list memory 129, free buffer linked list memory 130, and packet descriptor and parse result memory 131. In one specific example, a queue element is a storage element or pair of storage elements that stores: 1) a value, and 2) a pointer that points to another queue element. This is but an example. There are other ways of implementing queues in hardware as explained below (see, for example, FIG. 20 and the corresponding description), but this simplified way is used here for instructional and illustrative purposes in connection with the circuit of FIG. 16.

In the case of FIG. 16, each of memories 129 and 130 is a pipelined memory adapted to store queue elements. Each memory has a pipeline of stages. In one example, memory 129 is such a memory system and memory 130 is such a memory system. From the time a read request address is supplied to a memory system, a first clock cycle is required for address information to propagate to a pipeline register on the way to the memory. A second clock cycle is required to pass out of the pipeline register and to get set up on the address inputs of the internal memory. A third clock cycle is required for the data value to be output from the internal memory. A fourth clock cycle is required for the output data value to pass through a pipeline register. A fifth clock cycle is required to perform error detection and correction on the data. A sixth clock cycle is required to set a valid bit (to indicate the memory has output a valid data value). Accordingly, there are seven clock cycles of delay between the time a dequeue request is made from a requesting entity (for example, port dequeue engine 134) to the link manager 122 until the time the data (as read from a queue element in the memory) is loaded into the popped head pointer queue element (the replenish the head pointer queue element). Multiple reads of such a pipelined memory system can be taking place at the same time, with each stage operating on a different read in a pipelined manner.

For each linked list maintained by link manager 122, the link manager 122 maintains a first head pointer queue element H1, a second head pointer queue element H2, a first tail pointer queue element T1, a second tail pointer queue element T2, a head pointer active bit, a tail pointer active bit, a buffer count B#, and a packet count P#. Each of these linked lists is actually a dual linked list involving: 1) a first linked list of queue elements (involving the first head pointer queue element H1 and the first tail pointer queue element T1), and 2) a related second linked list of queue elements (involving the second head pointer queue element H2 and the second tail pointer queue element T2). Into which of the two linked lists the next value (in this case, the next buffer ID) will be pushed in a push operation is determined by the content of the tail pointer active bit. From push to push, the value of the tail pointer active bit toggles. From which of the two linked lists the next value will be popped in a pop operation is determined by the content of the head pointer active bit. From pop to pop, the value of the head pointer active bit toggles. The link manager 122 can maintain up to sixty-four such dual linked lists of queue elements, as well as a dual linked list of queue elements for the free buffer linked list.

An enqueue engine (for example, port enqueue engine 133 of FIG. 10) can cause a sequence of values (in this case, a sequence of buffer IDs) to be enqueued into one of the dual linked lists such that the odd values of the sequence are enqueued by pushing the odd values into the first linked list of queue elements, and such that the even values of the sequence are enqueued by pushing the even values into the second linked list of queue elements. Values are pushed into the first and second linked lists in alternating fashion, with the content of the tail pointer active bit indicating which one of the two linked lists will be pushed next.

In this example, each of the two linked lists of a dual linked list operates as follows. If the linked list is empty, then neither the tail pointer queue element nor the head pointer queue element stores any value (any buffer ID). The next value that is pushed into the linked list is written into both the head and the tail pointer queue elements. If there is already one value stored in the linked list, and another value is to be pushed, then the new value is pushed into the tail pointer queue element. The head pointer queue element is made to point to the tail pointer queue element. At this point the head and tail pointer queue elements store different values, and two values are stored in the linked list. If there are already two values stored in the linked list in this way, and a third value is to be pushed, then the new value is pushed into the tail pointer queue element, and the value that was in the tail pointer queue element is stored in a third queue element in memory. The head pointer queue element is made to point to the queue element in memory, and the queue element in memory is made to point to the tail queue element. If there are already three values being stored in the linked list, and fourth value is to be pushed into the linked link, then the value of the tail pointer is moved into memory to be the value of a second queue element in memory, and the new value is pushed into the tail pointer queue value. The header pointer queue element is made to point to the second queue element in memory, the second queue element in memory is made to point to the first queue element in memory, and the first queue element in memory is made to point to the tail pointer queue element.

In this example, the opposite procedure is followed to pop a value off a linked list. The value of the head pointer queue element is output (popped), and the value of the queue element to which the head pointer queue element had previously pointed is moved to the new head pointer queue element. The head pointer queue element is changed so that it points to the next queue element in the linked list. If there are only two values stored in the linked list, then those two values will be stored in the head and tail pointer queue elements, and the head pointer queue element will point to the tail. If in that condition the linked list is to be popped, then the value of the head pointer is output (popped), and the value of the tail is copied to the head pointer queue element such that both the head and tail pointer queue elements will store the same value. In this condition, the linked list stores one value. If in this condition the linked list is to be popped, then the value of the head pointer queue element is output (popped) and both the head and tail pointers are erased (both the head pointer queue element and the tail pointer queue element are empty).

The dual linked list system 200 maintains two such linked lists for each dual linked list. Popping a head pointer queue element takes a relatively small amount of time (for example, two clock cycles) as compared to the larger amount of time required to read a value out of the memory to replenish the head pointer. If the dual linked list is popped twice in rapid succession, then one of the head pointer queue element is popped, and then the other head pointer queue element is popped. During the time that the second head pointer queue element is supplying its output value, the memory can be updating a queue element of the linked list associated with the first head pointer. Likewise, if the dual linked list is popped again, then the first head pointer will be popped, and while the first head pointer is outputting its value the memory can be updating a queue element of the linked list associated with the second head pointer. Due to the pipelined nature of the memory, the rate at which a head pointer value can be popped off the dual linked list is smaller than the read access latency time of the memory. The dual linked list system can be popped to output a new buffer ID every other clock cycle, and the dual linked list system can pop a dual linked list repeatedly at a sustained rate to output two buffer IDs each seven clock cycles. Each of the sixty-four linked lists for the sixty-four virtual channels is such a dual linked list. Also, the linked list for the free buffer linked list is such a dual linked list. As described above, the values stored in these linked lists are buffer IDs.

FIG. 16 illustrates a condition in which a dual linked list of eight queue elements stores eight values (eight buffer IDs) for the first virtual channel. The first value in the sequence of values to be pushed into the dual linked list is stored in QE1. The second value in the sequence is stored in QE2, and so forth. The first head pointer queue element H1 stores the first value, and points to the queue element QE3 in memory that stores the third value. This queue element QE3 points to the queue element Q5 in memory that stores the fifth value. This queue element QE5 points to the T1 tail queue element that stores the seventh value. The tail pointer queue element does not pointer anywhere because it is the tail. That is the first linked list of the dual linked list. The second linked list of the dual linked list involves the second value that is stored in the H2 head pointer queue element QE2. The H2 queue element (QE2) points to the queue element Q4 in memory that stores the fourth value. This queue element QE4 points to the queue element QE6 in memory that stores the sixth value. This queue element QE6 points to the T2 tail pointer queue element (QE8) that stores the eighth value. The T2 tail pointer queue element does not point anywhere because it is a tail pointer queue element. According the first value of the sequence is stored in QE1, the second value of the sequence is stored in QE2, the third value of the sequence is stored in QE3, and so forth. If the linked list is to be popped, then the values of the sequence will be read out of the head pointer queue elements in the same order. The first value will be popped first, the second value will be popped second, and so forth. In addition to this dual linked list maintained for the first virtual channel, a second dual linked list is maintained for the free buffer linked list. In the case of the free buffer linked list, the link manager 122 maintains a free buffer head FIFO 181. If, for example, the free buffer head FIFO 181 can store four values (four buffer IDs), then the link manager 122 keeps the head pointer queue elements popped such that the next four head pointer values (that could be popped) are preloaded from the linked list and are sitting in the free buffer head FIFO. The read access time for reading the free buffer head FIFO is smaller than the read access time of the free buffer linked list memory 130, so four successive buffer IDs can be supplied by the overall free buffer dual linked list in rapid succession with the buffer IDs that are output being drawn from the free buffer head FIFO.

Figure 17:
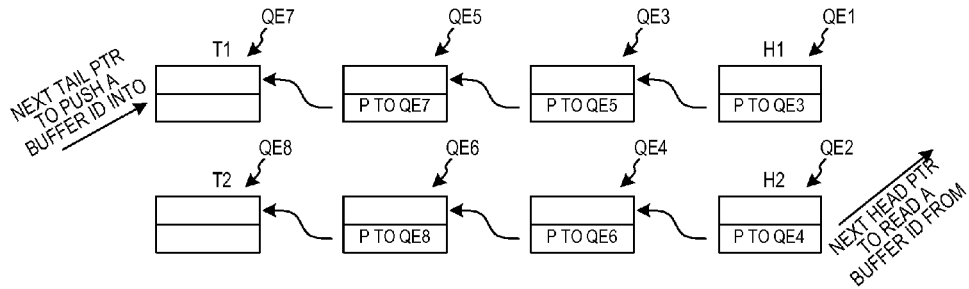
FIG. 17 is a diagram that illustrates the first and second linked lists that together comprise a dual linked list.

FIG. 17 is a diagram that illustrates the two linked lists of the dual linked list for the first virtual channel, as explained above. The first linked list involves the queue elements QE1, QE3, QE5 and QE7 storing the odd values of the sequence of values. The second linked list involves the queue elements QE2, QE4, QE6 and QE8 storing the even value of the sequence of values. Values are pushed onto the tail pointer queue elements, and are popped off the head pointer queue elements. The "values" are buffer IDs.

Figure 18:
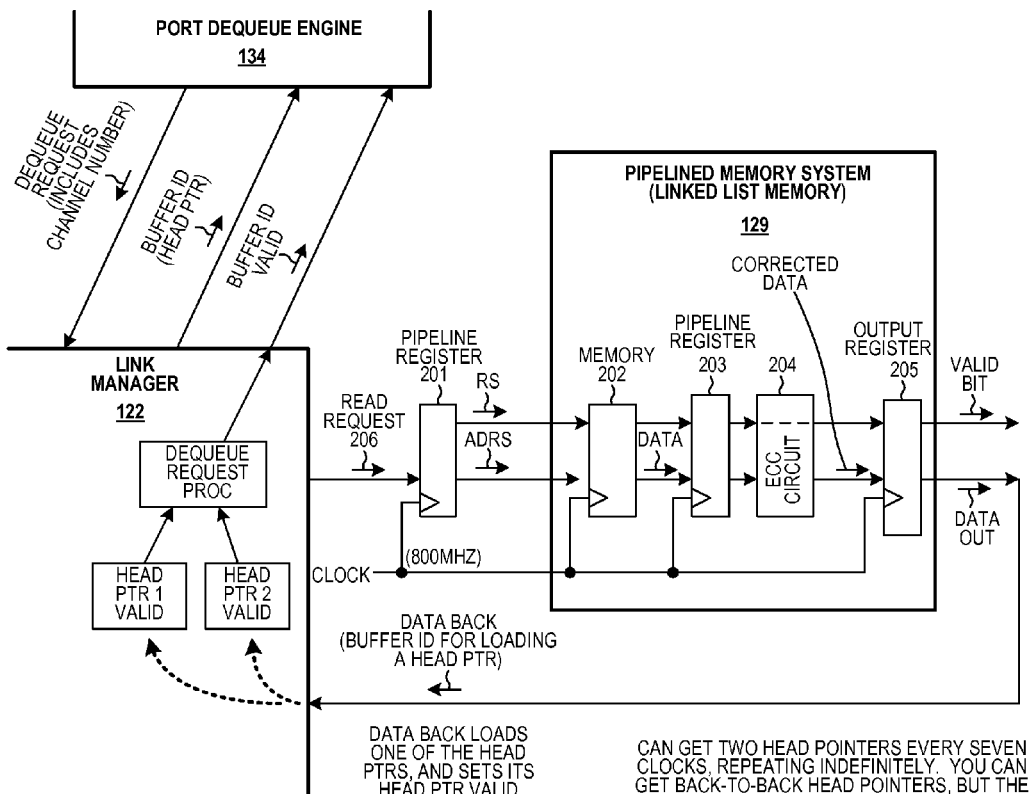
FIG. 18 is a diagram that illustrates how a dequeue request is handled by the link manager and the pipelined linked list memory.

FIG. 18 is a diagram that illustrates how a value (a buffer ID) is popped off a dual linked list. A port dequeue engine 134 issues a dequeue request to the link manager 122 along with a virtual channel number. The virtual channel number indicates which one of multiple dual linked lists is to be popped. The active head pointer queue element (as indicated by the head pointer active bit) is popped and the obtained buffer ID is returned to the port dequeue engine 134. The linked list (that involves the head pointer queue element that was just popped) must, however, be updated. The queue element in the memory to which the head pointer queue element had pointed must be read from memory, and that value must then be loaded into the head pointer queue element that was just popped. To do this, a read request 206 is issued to pipelined memory system 129. A first clock cycle is required by the link manager 122 to respond to the dequeue request and to get a read address output to a pipeline register 201 on the way to the pipelined memory system. A second clock cycle is required to pass out of the pipeline register 201 and to get set up on the address inputs of the internal memory 202. A third clock cycle is required for the data value to be output from the internal memory 202. A fourth clock cycle is required to pass through a pipeline register 203. A fifth clock cycle is required to for an ECC circuit 204 to perform error detection and correction on the data. A sixth clock cycle is required to pass through an output register 205 and to set a valid bit (to indicate a valid data value is available on the outputs of the pipelined memory system). From the time the dequeue request is supplied from the port dequeue engine 134 to the link manager 122 until the time the read data (the buffer ID) from the pipelined memory 129 is loaded into the head pointer queue element (the head pointer queue element that was just popped) is seven clock cycles. The pointer of the head pointer queue element in the link manager 122 is changed so that it contains the pointer of the queue element just read out of memory. The result is that the head pointer queue element correctly points to the next queue element in the appropriate linked list. When this is done, the head pointer queue element is said to be "replenished".

Figure 19:
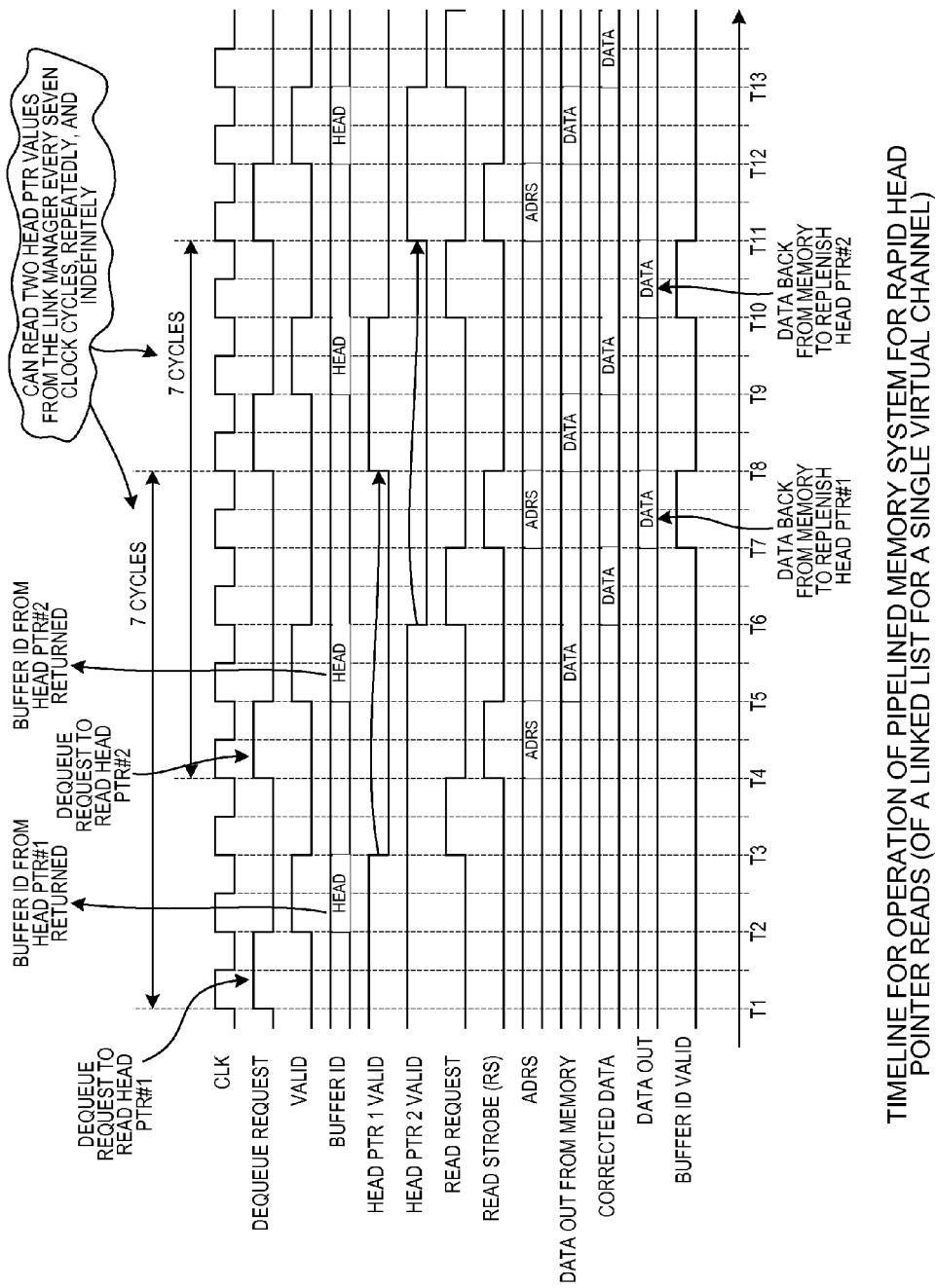
FIG. 19 is a simplified waveform diagram that illustrates how two rapid dequeue requests (of the dual linked list for the same virtual channel) are handled by the link manager and the pipelined linked list memory.
Figure 20A:
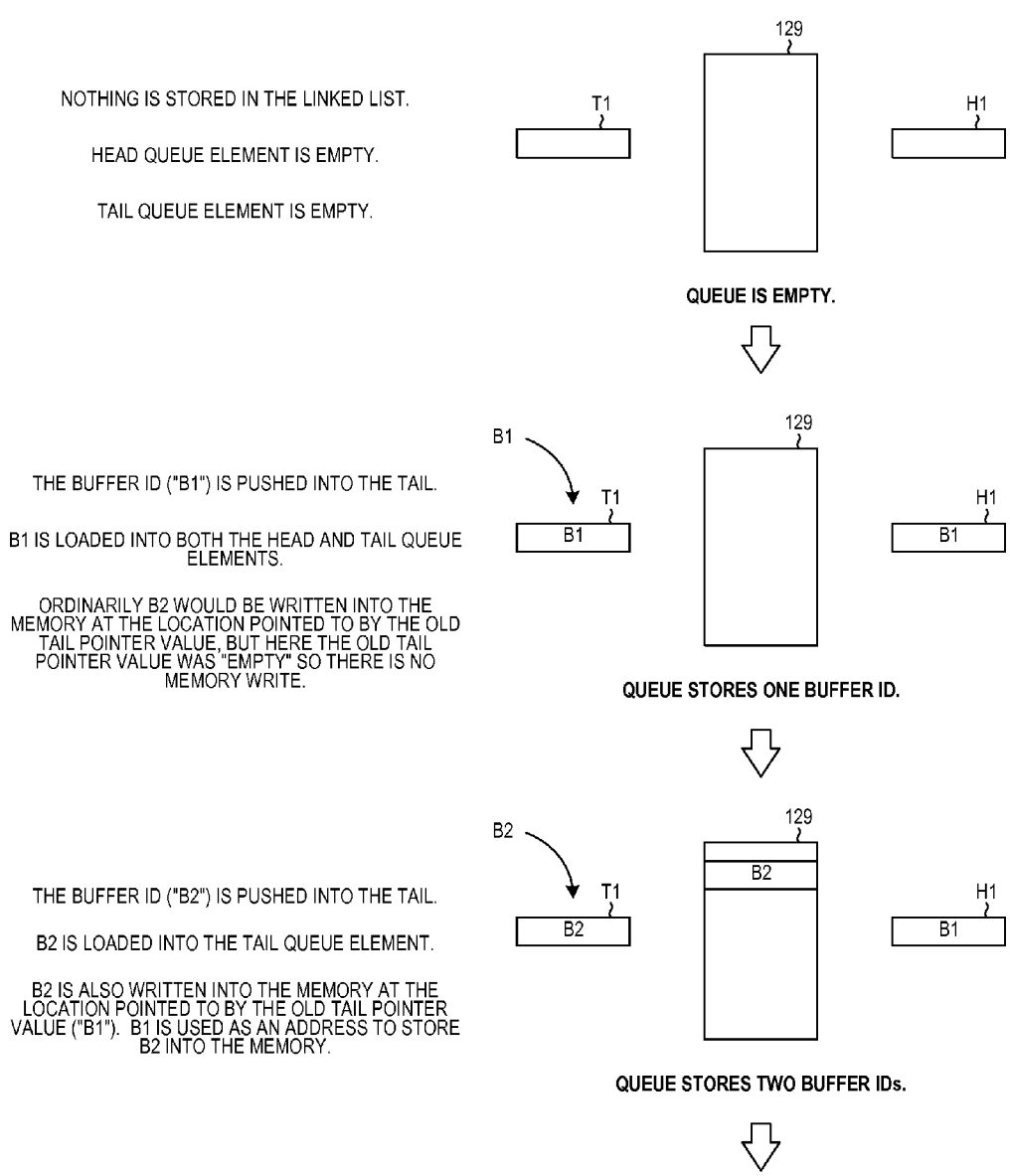
FIG. 20A is a part of a larger diagram (FIG. 20) that illustrates a pushing and a popping of another embodiment of one of the two linked lists of a novel dual linked list.
Figure 20C:
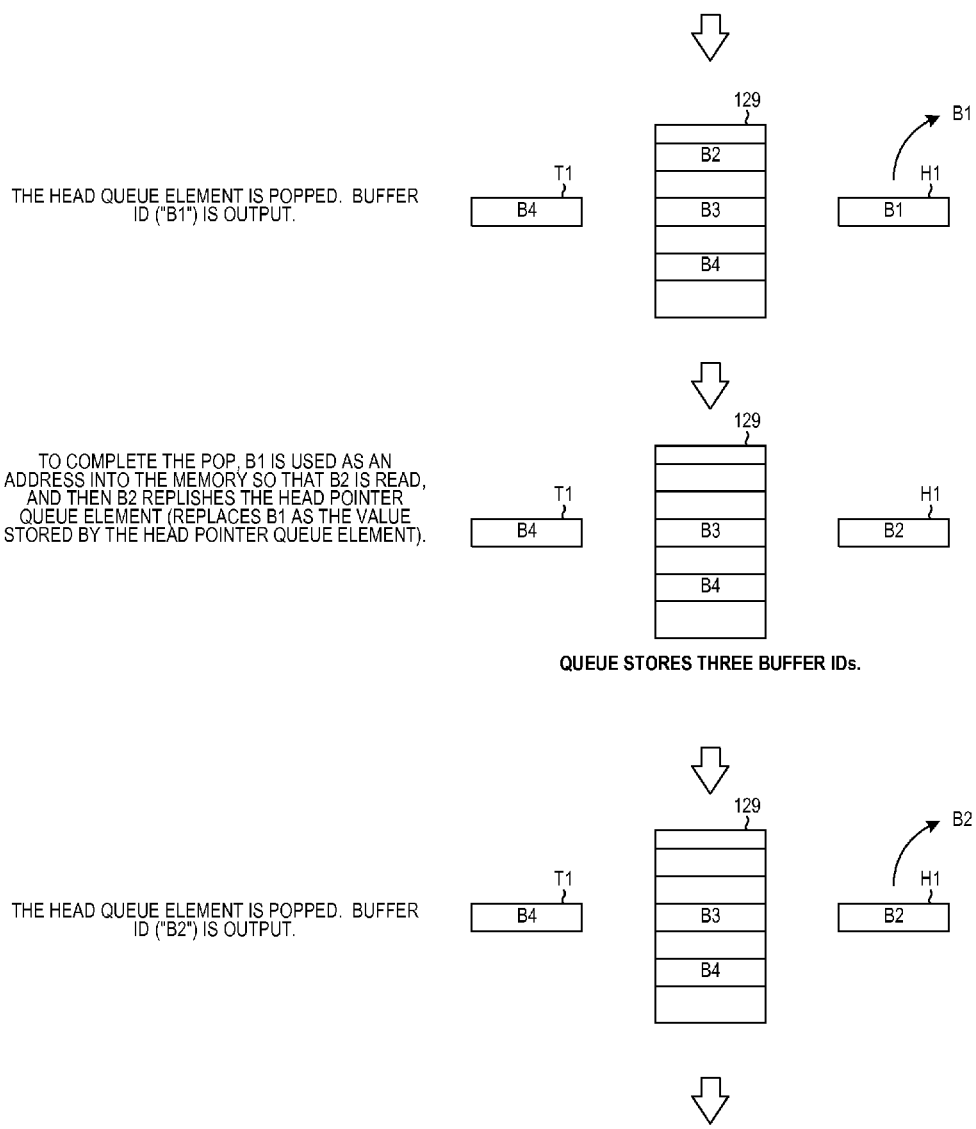
FIG. 20C is a part of a larger diagram (FIG. 20) that illustrates a pushing and a popping of another embodiment of one of the two linked lists of a novel dual linked list.
Figure 20D:
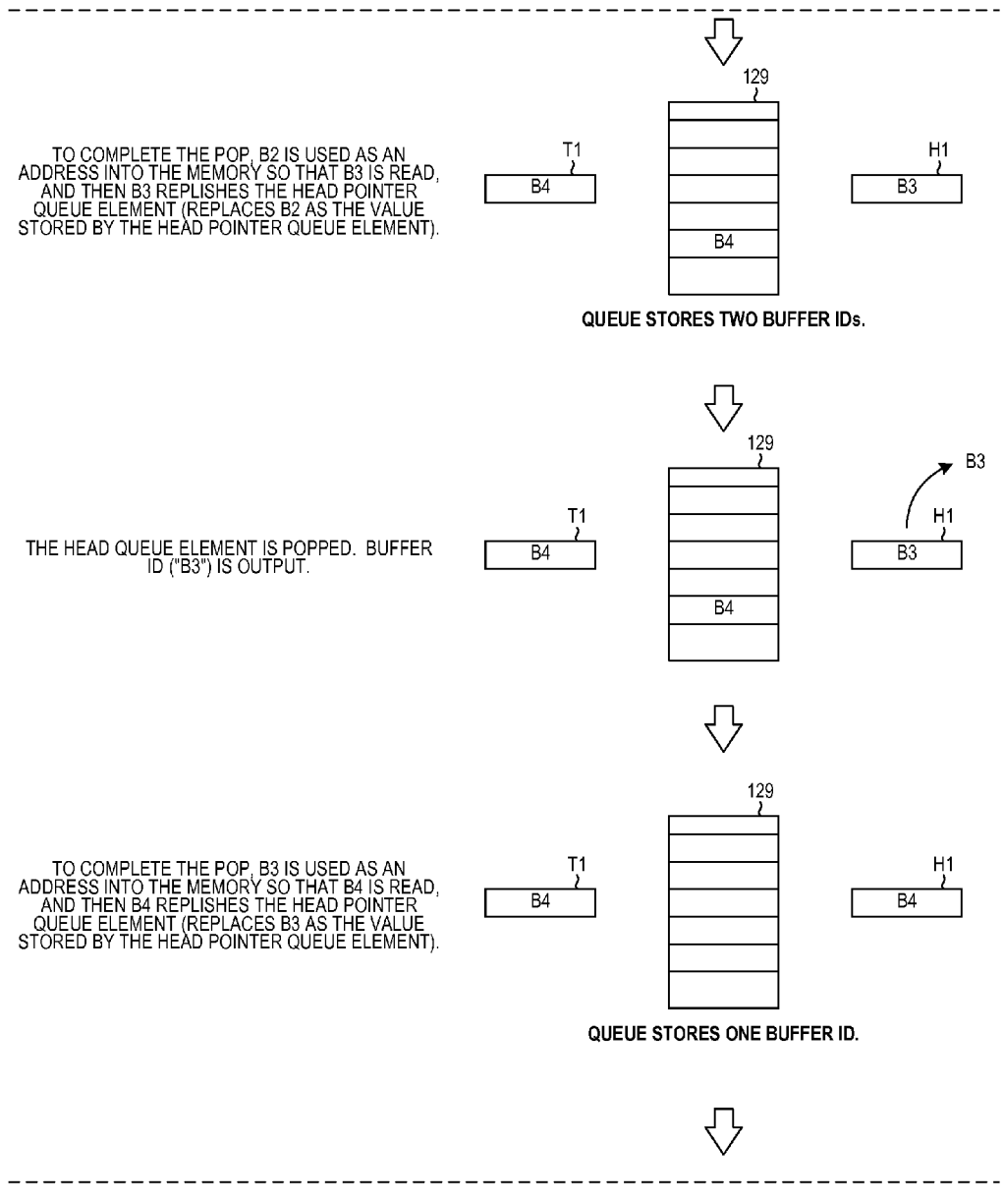
FIG. 20D is a part of a larger diagram (FIG. 20) that illustrates a pushing and a popping of another embodiment of one of the two linked lists of a novel dual linked list.
Figure 20E:
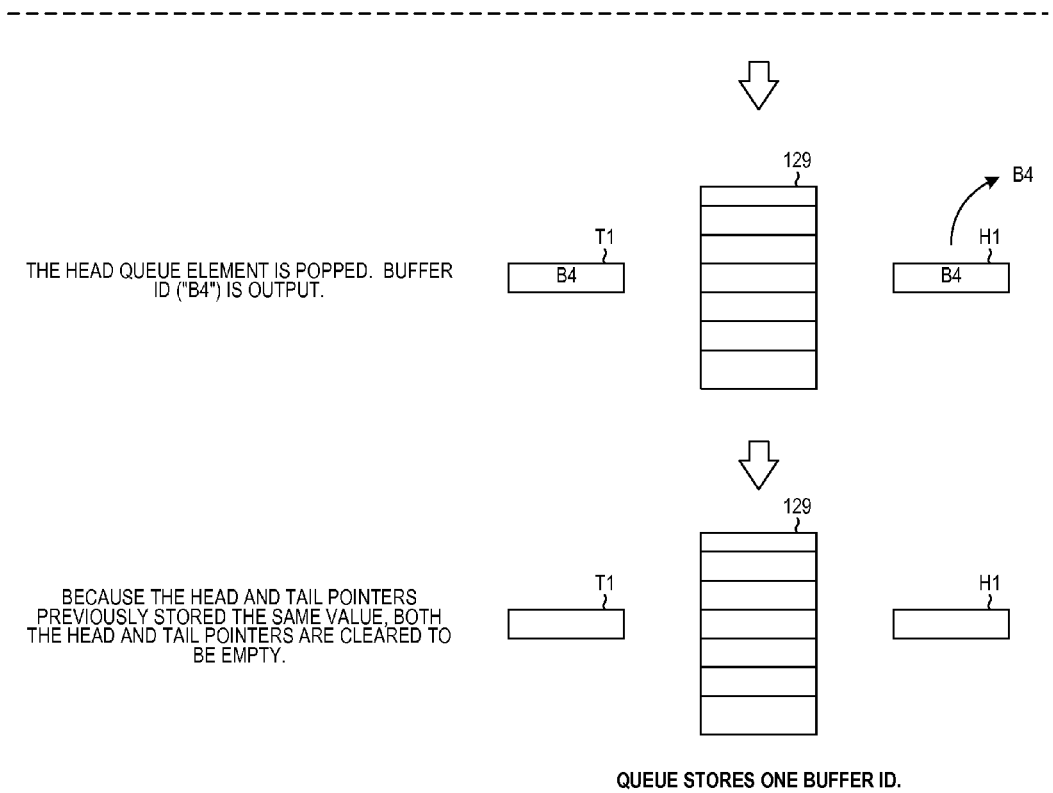
FIG. 20E is a part of a larger diagram (FIG. 20) that illustrates a pushing and a popping of another embodiment of one of the two linked lists of a novel dual linked list.

FIG. 19 is a simplified waveform diagram that illustrates two head pointer queue element pops done one after the other in rapid succession for the same virtual channel, in the case of dequeueing two consecutive frames that are of the minimum frame size (sixty-four bytes). From the time of the first dequeue request a time T1 until the time when the read buffer ID has replenished the popped head pointer queue element at time T8 is seven clock cycles. Nonetheless, due to pipelining in the memory, two head pointer values can be popped from the link manager 122 every seven clock cycles, repeatedly, and indefinitely. As shown in FIG. 19, multiple read assess of the pipelined memory are occurring at the same time, with one read access passing through the stages of the pipeline memory a few clock cycles behind the other.

The term "queue element" as it is used in this patent document is a broad term. There are multiple ways of implementing a queue element. A queue element need not necessarily involve a storage location in a memory or other sequential logic element, where both the value of the queue element is stored and also the pointer of the queue element is stored. In some examples of a queue element, the association of the pointer of the queue element and the value of the queue element is maintained by the way values are stored in a memory and by the way that memory is addressed. For example, the value of a first queue element may itself be used as the pointer of the queue element, where the pointer of the queue element is used as an address into the memory to address the next queue element that is being pointed to. The address location pointed to is made to store the value of the next queue element.

FIGS. 20A-20E together form a larger diagram, FIG. 20. FIG. 20 illustrates an example of pushing and popping one of the two linked lists of the dual linked list for the first virtual channel, for the novel dual linked list of buffers described above. Initially, in this example, the linked list empty. The head pointer queue element H1 is empty and the tail pointer queue element T1 is empty. Next, a first value is pushed. In this example, the values pushed are buffer identification values (buffer IDs). The first value B1 is pushed, by pushing the value B1 into the tail pointer queue element T1. Ordinarily, the value being pushed (in this case B2) would then also be written into the memory at the location pointed to by the old tail pointer value, but here the old tail pointer value is "empty" so there is no memory write. In addition, the value being pushed (B2) is stored into the head pointer queue element H1. At this point, both the head and tail pointer queue elements store the same value B1 and the linked list (the "queue") stores one value, B1. In this pipelined memory a write can be performed in one clock cycles, whereas a read requires seven clock cycles (from the time a read request is made until the data read is returned from the pipelined memory).

Next, the second value is pushed. The value B2 is loaded into the tail pointer queue element T1, and in addition the new value being pushed (B2) is written into the memory at the location pointed to by the old tail pointer value (B1). At this point, the head pointer queue element H1 stores the value B1, the tail pointer queue element T1 stores the value B2, and the value B2 is stored in the memory at the location pointed to by the value B1. The linked list stored two values.

Next, a third value (B3) is pushed. The value B3 is loaded into the tail pointer queue element T1, and in addition the new value being pushed (B3) is written into the memory at the location pointed to by the old tail pointer value (B2). At this point, the head pointer queue element H1 stores the value B1, the tail pointer queue element T1 stores the value B3, the memory stores the value B2 at the location pointed by B1, and the memory stores the value B3 at the location pointed to by B2. The linked list stores three values.

Next, a fourth value (B4) is pushed. The value B4 is loaded into the tail pointer queue element T1, and in addition the new value being pushed (B4) is written into the memory at the location pointed to by the old tail pointer value (B3). At this point, the head pointer queue element H1 stores the value B1, the tail pointer queue element T1 stores the value B4, the memory stores the value B2 at the location pointed by B1, and the memory stores the value B3 at the location pointed to by B2, and the memory stores the value B4 at the location pointed to by B3. The linked list stores four values.

Next, in this example, the linked list is popped. The value B1 stored in the head pointer queue element H1 is output. To replenish the head pointer queue element H1 so that it stores the next value to be popped, the memory is read at the location pointed to by the old head pointer value (B1). The value stored in memory at the location addressed by the value B1 is the value B2. This value B2 is therefore read from memory, and is loaded into the head pointer queue element H1. At this point, the tail pointer queue element T1 stores the value B4, the head pointer queue element H1 stores the value B2, the memory stores the value B3 at the location pointed by the value B2, and the memory stores the value B4 at the location pointed to by the value B3. The linked list stores three values.

Next, the linked list is popped for the second time. The value B2 stored in the head pointer queue element H1 is output. To replenish the head pointer queue element H1 so that it stores the next value to be popped, the memory is read at the location pointed to by the old head pointer value (B2). The value stored in memory at the location addressed by the value B2 is the value B3. This value B3 is therefore read from memory, and is loaded into the head pointer queue element H1. At this point, the tail pointer queue element T1 stores the value B4, the head pointer queue element H1 stores the value B3, and the memory stores the value B4 at the location pointed to by the value B3. The linked list stores two values.

Next, the linked list is popped for the third time. The value B3 stored in the head pointer queue element H1 is output. To replenish the head pointer queue element H1 so that it stores the next value to be popped, the memory is read at the location pointed to by the old head pointer value (B3). The value stored in memory at the location addressed by the value B3 is the value B4. This value B4 is therefore read from memory, and is loaded into the head pointer queue element H1. At this point, the tail pointer queue element T1 stores the value B4, and the head pointer queue element H1 also stores the value B4. The linked list stores one value.

Next, the linked list is popped for the fourth time. The value B4 stored in the head pointer queue element H1 is output. Because the values stored in the head pointer queue element H1 and the tail pointer queue element T1 were the same prior to the fourth pop, the head and tail pointer values are now made to be empty. The linked list is empty. Accordingly, in the example of FIG. 20, each queue element is a single storage location.

FIG. 21 is a diagram of the form of an IEEE 802.3x Priority Flow Control (PFC) pause frame 210, such as might be output by the NFP integrated circuit 9 when one or more virtual channels are overloaded. In the case of PCP flow merging happening in the port enqueue engine responsible for handling ingress through the physical MAC port (the port through which the overloading frames were received), the PFC pause frame 210 is output in the opposite direction on that same physical MAC port. The PFC pause frame is a request that the sender of the ethernet frames pause in sending frames on the physical MAC port if those frames have specified PCP code values. In the PFC pause frame, multiple ones of the enable bits in the priority class enable vector are set if PCP flow merging is employed, and the merged flow is to be paused. For example, in the case of the PCP flow merging of FIG. 14, and in the case of overloading of the virtual channel into which the three PCP flows (for PCP values 5, 6 and 7) are merged, the enable bits EN[5], EN[6] and EN[7] in the PFC pause frame are set. The setting of these enable bits means that a pause request is being made: 1) to pause flows having a PCP code value of 5 for a pause time specified by a corresponding one of the pause time fields denoted "PAUSE TIME (P CLASS 5)", 2) to pause flows having a PCP code value of 6 for a pause time specified by a corresponding one of the pause time fields denoted "PAUSE TIME (P CLASS 6)", and 3) to pause flows having a PCP code value of 7 for a pause time specified by a corresponding one of the pause time fields denoted "PAUSE TIME (P CLASS 7)". All three PCP flows that are being merged into the one overloaded virtual channel are all requested to be paused at the same time due to the same one PFC pause frame 210. To generate the pause frame, the port enqueue engine outputs the enable bits on conductors 175 of FIG. 10A. In response, the appropriate physical MAC port (configured portion of the Ethernet MAC portion 123) handles generating the PFC pause frame and outputting the PFC pause frame on the physical MAC port.

Figure 22:
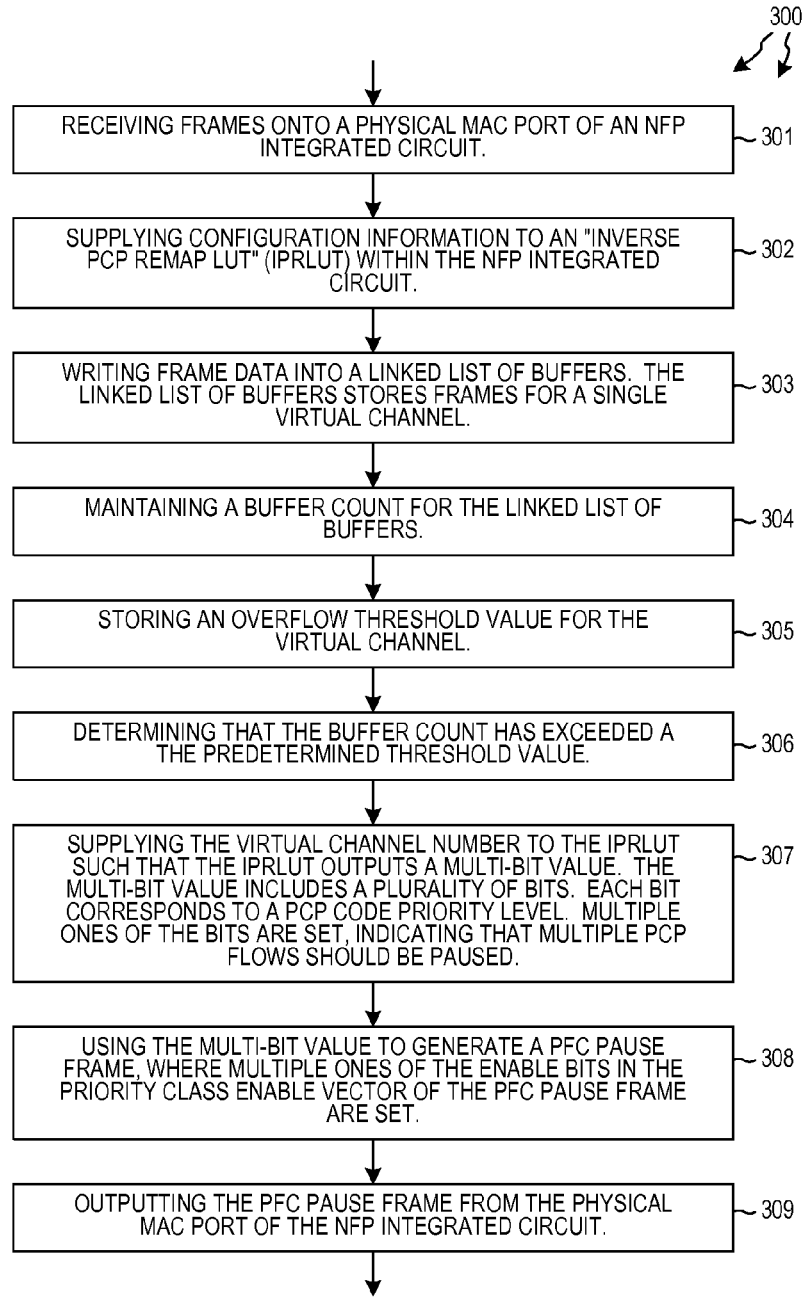
FIG. 22 is a flowchart of a method that involves inverse PCP flow remapping and generation of PFC pause frame in accordance with the fourth novel aspect.

FIG. 22 is a flowchart of a method that involves inverse PCP flow remapping in accordance with one novel aspect. Multiple frames are received (step 301) onto a physical MAC port of the NFP integrated circuit. Configuration information is supplied (step 302) to an "Inverse PCP Remap LUT" (IPRLUT) circuit within the NFP integrated circuit. Frame data is written (step 303) into a linked list of buffers, where the linked list of buffers stores frames for a single (one and only one) virtual channel. A buffer count is maintained (step 304) for the linked list of buffers. As the frames are received, the frames data is stored in the linked list of buffers and the buffer count goes up and down depending on how the enqueue engine and the dequeue engine handling the virtual channel are operating. The NFP integrated circuit also stores (step 305), for the virtual channel, a predetermined overflow threshold value. This predetermined overflow value may be part of the configuration information and/or may be supplied by another monitoring processor. In this example, at a point in the receiving of frames, the link manager determines (step 306) that the buffer count has exceeded the predetermined overflow threshold value. As a result of the determining that the buffer count has exceeded the predetermined threshold value, the virtual channel number is supplied (step 307) to the IPRLUT. In response, the IPRLUT outputs a multi-bit value. The inverse lookup function is determined by the configuration information loaded into the IPRLUT in step 302. The multi-bit value includes a plurality of bits, where each bit corresponds to a PCP code priority level. In the enqueuing operation, PCP merging was performed. Accordingly, multiple ones of the bits in the multi-bit value (output by the IPRLUT) are set, thereby indicating that not just one but rather multiple PCP flows should be paused. Even though only one virtual channel may be overloaded, multiple PCP flows are to be paused. The multi-bit value as output by the IPRLUT is then used (step 308) to generate a PFC pause frame, where multiple ones of the enable bits in the priority class enable vector of the PFC pause frame are set. FIG. 21 is a diagram of the format of the PFC pause frame. In the example of FIGS. 9 and 10, the Ethernet MAC portion 123 performs this operation of generating the PFC pause frame from the multi-bit value. The resulting PFC pause frame is then output (step 309) from the physical MAC port of the NFP integrated circuit.

In one example, to realize an integrated circuit embodiment of the ingress MAC island circuitry of FIG. 5, the function of the each circuit block is described in a hardware description language (for example, Verilog or VHDL or CDL). A hardware description language description of Ethernet MAC portion 123 is obtained from MorethanIP GmbH, Muenchner Strasse 199, D-85757 Karlsfeld, Germany, and is incorporated into the overall hardware description. A commercially available hardware synthesis program (for example, Synopsis Design Compiler) is then employed to generate digital logic circuitry from the hardware description language description, where the synthesized digital logic circuitry performs the function described by the hardware description language.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
 (a) receiving frames onto a physical MAC port of a Network Flow Processor (NFP) integrated circuit;
 (b) supplying configuration information to an Inverse PCP Remap Look Up Table (IPRLUT) circuit of the NFP integrated circuit;
 (c) writing frame data of the frames into a linked list of buffers, wherein the linked list of buffers stores frame data for a single virtual channel, wherein the single virtual channel is identified by a virtual channel number;
 (d) maintaining a buffer count for the linked list of buffers;
 (e) determining that the buffer count has exceeded a predetermined threshold value;
 (f) supplying the virtual channel number to the IPRLUT circuit such that the IPRLUT circuit outputs a multi-bit value, wherein the multi-bit value includes a plurality of bits, wherein each respective one of the plurality of bits corresponds to a respective one of eight PCP (Priority Code Point) priority levels;
 (g) in response to the determining of (e) using the multi-bit value to generate a Priority Flow Control (PFC) pause frame, wherein the PFC pause frame has a priority class enable vector field, wherein the priority class enable vector field includes a plurality of enable bits, wherein each respective one of the plurality of enable bits corresponds to a respective one of the eight PCP priority levels, and wherein multiple ones of the enable bits are set thereby indicating that multiple ones of the PCP priority levels are to be paused; and
 (h) outputting the PFC pause frame from the physical MAC port.

2. The method of claim 1, wherein the NFP integrated circuit comprises a plurality of IPRLUT circuits, wherein each of the IPRUT circuits is independently configurable with respect to the other IPRUT circuits, wherein the NFP integrated circuit comprises a Media Access Control (MAC) layer interface circuit that is configurable into a plurality of physical MAC ports, and wherein there is a one IPRLUT circuit for each of the physical MAC ports.

3. The method of claim 1, wherein there is a number of virtual channels through the NFP integrated circuit, wherein the NFP maintains a linked list of buffers for each of the virtual channels, and wherein the number of physical MAC ports into which the MAC layer interface is configured multiplied by eight is greater than the number of virtual channels.

4. The method of claim 1, wherein the buffer count indicates a number of buffers in the linked list of buffers.

5. A Network Flow Processor (NFP) integrated circuit comprising:
- a Media Access Control (MAC) layer interface circuit that is configured into a plurality of physical MAC ports, wherein each physical MAC port can receive one or more flows of ethernet frame data onto the NFP integrated circuit, wherein all the frames of a flow are received via the same physical MAC port and wherein all of the frames of the flow have the same PCP value;
- a memory that stores a plurality of linked lists of buffers, wherein there is one linked list of buffers for each corresponding respective one of a plurality of virtual channels, wherein the number of physical MAC ports multiplied by eight is larger than the number of virtual channels;
- a link manager that maintains, for each linked list of buffers, a buffer count, wherein the buffer count indicates a number of buffers in the linked list of buffers; and
- a plurality of port enqueue engines, wherein there is one port enqueue engine for each of the physical MAC ports, wherein the port enqueue engine for a particular physical MAC port: 1) is configurable to cause frame data from multiple flows received via the particular physical MAC port to be stored into the same one linked list of buffers for a virtual channel, and 2) if the buffer count for the linked list of the virtual channel exceeds a predetermined threshold value then the port enqueue engine causes a PFC pause frame to be output from the particular physical MAC port, wherein the PFC pause frame output from the particular physical MAC port has a priority class enable vector field, wherein the priority class enable vector field includes a plurality of enable bits, wherein each respective one of the plurality of enable bits corresponds to a respective one of the eight PCP flows, and wherein multiple ones of the enable bits are set thereby indicating that the multiple flows are to be paused.

6. The NFP integrated circuit of claim 5, wherein the virtual channel whose buffer count exceeds the predetermined threshold value is identified by a virtual channel number, wherein each port enqueue engine includes an Inverse PCP Remap Look Up Table (IPRLUT) circuit, wherein the IPRLUT circuit of the port enqueue engine for the particular physical MAC port receives the virtual channel number and in response outputs a multi-bit value, wherein the multi-bit value output by the IPRLUT circuit includes a plurality of bits, wherein each respective one of the plurality of bits corresponds to a respective one of eight PCP (Priority Code Point) priority levels.

7. The NFP integrated circuit of claim 5, wherein the port enqueue engine for the particular physical MAC port comprises:
- a IPRLUT circuit;
- a comparator that receives a buffer count from the link manager, and that compares the buffer count to the predetermined threshold value; and
- a circuit that supplies a virtual channel number to the IPRLUT circuit such that if the comparator determines that the buffer count exceeds the predetermined threshold value then the IPRLUT circuit outputs a multi-bit value, wherein the multi-bit value includes a plurality of bits, wherein each respective one of the plurality of bits corresponds to a respective one of eight PCP (Priority Code Point) priority levels.

8. The NFP integrated circuit of claim 7, wherein the multi-bit value output by the IPRLUT circuit is supplied to the MAC layer interface circuit, and wherein the MAC layer interface circuit uses the multi-bit value to generate a PFC pause frame.

9. A method comprising:
- (a) configuring a Media Access Control (MAC) layer interface circuit of a Network Flow Processor (NFP) integrated circuit into a plurality of physical MAC ports, wherein each of the physical MAC port can receive one or more PCP (Priority Code Point) flows of ethernet frame data onto the NFP integrated circuit, wherein all the frames of a PCP flow are received via the same physical MAC port and wherein all of the frames of a PCP flow have the same PCP value;
- (b) receiving multiple PCP flows of frame data onto the NFP integrated circuit via one of the physical MAC ports and writing the frame data of the multiple flows into a single linked list of buffers associated with a single virtual channel, wherein the single linked list of buffers stores frame data for the single virtual channel, wherein the single virtual channel is identified by a virtual channel number;
- (c) maintaining a buffer count for the linked list of buffers;
- (d) determining that the buffer count has exceeded a predetermined threshold value;
- (e) using the virtual channel number to generate a multi-bit value, wherein individual bits of the multi-bit value corresponding to individual PCP flows, and wherein the multi-bit value identifies the multiple PCP flows associated with the linked list of buffers whose buffer count was determined in (d) to have exceeded the predetermined threshold value;
- (f) using the multi-bit value generated in (e) to generate a Priority Flow Control (PFC) pause frame, wherein the PFC pause frame has a priority class enable vector field, wherein the priority class enable vector field includes a plurality of enable bits, wherein each respective one of the plurality of enable bits corresponds to a respective one of eight PCP priority levels, and wherein multiple ones of the enable bits are set thereby indicating that the multiple PCP flows identified in (e) are to be paused; and
- (g) outputting the PFC pause frame from the physical MAC port, wherein (b) through (g) are performed by the NFP integrated circuit.

10. The method of claim 9, wherein frames passing into the NFP integrated circuit via a single physical MAC port can be stored in multiple linked lists of buffers, wherein each of the multiple linked lists of buffers is for a different virtual channel, and wherein the NFP integrated circuit can output a PFC pause frame to pause PCP flows that are being stored into one of the linked lists of buffers without outputting a PFC pause frame to pause another PCP flow that is being stored into another of the linked lists of buffers.

11. The method of claim 9, wherein the NFP integrated includes a plurality of port enqueue engines, wherein there is one port enqueue engine for each physical MAC port, wherein each port enqueue engine stores configuration information that determines which PCP flows will be merged by the port enqueue engine so that their frame data will be stored into a single linked list of buffers, the method further comprising:
- (h) supplying a separate amount of configuration information to each different one of the port enqueue engines.

12. The method of claim 11, wherein the configuration information stored in a port enqueue engine determines an inverse PCP remap function, wherein the inverse PCP remap function determines a multi-bit value that corresponds to each possible virtual channel number.

13. The method of claim 11, wherein the configuration information stored in a port enqueue engine loads an Inverse PCP Remap Look Up Table (IPRLUT) circuit.

14. A method involving a Network Flow Processor (NFP) integrated circuit that is configured to have a plurality of physical MAC ports, wherein each of the physical MAC ports can receive one or more PCP (Priority Code Point) flows of ethernet frame data onto the NFP integrated circuit, wherein all the frames of a PCP flow are received via the same physical MAC port and wherein all of the frames of a PCP flow have the same PCP value, the method comprising:
 (a) receiving multiple PCP flows of frame data onto the NFP integrated circuit via one of the physical MAC ports and writing the frame data of the multiple flows into a single linked list of buffers associated with a single virtual channel, wherein the single linked list of buffers stores frame data for the single virtual channel, wherein the single virtual channel is identified by a virtual channel number;
 (b) maintaining a count for the virtual channel;
 (c) determining that the count has exceeded a predetermined threshold value; and
 (d) in response to the determining of (c) outputting a PFC pause frame from the physical MAC port, wherein the PFC pause frame has a priority class enable vector field, wherein the priority class enable vector field includes a plurality of enable bits, wherein each respective one of the plurality of enable bits corresponds to a respective one of eight PCP priority levels, and wherein multiple ones of the enable bits are set thereby indicating that the multiple PCP flows received in (a) are to be paused.

15. The method of claim 14, wherein at least one PCP flow received onto said one of the physical MAC ports is not paused as a result of the outputting of the PFC pause frame in (d), wherein an enable bit in the priority class enable vector field corresponds to said at least one PCP flow that is not paused, and wherein the enable bit in the PFC pause frame is not set.

16. The method of claim 14, wherein frame data received onto said one of the physical MAC ports is stored into multiple linked lists of buffers, wherein a count is maintained for each of the multiple linked lists of buffers, the method further comprising:
 (e) storing a separate predetermined threshold value for each of the counts.

17. The method of claim 14, wherein the count maintained in (b) is a buffer count of a number of buffers in said single linked list of buffers.

18. The method of claim 14, wherein the count is indicative of an amount of frame data stored in a memory.

19. The method of claim 14, further comprising:
 (e) generating the PFC pause frame by supplying the virtual channel number to an Inverse PCP Remap Look Up Table (IPRLUT) circuit such that the IPRLUT circuit outputs a multi-bit value, wherein individual bits of the multi-bit value correspond to individual PCP flows, and wherein the multi-bit value identifies the multiple PCP flows associated with the virtual channel whose count is determined in (c) to have exceeded the predetermined threshold value.

20. The method of claim 19, wherein the generating of (e) further involves supplying the multi-bit value to one of the physical MAC ports such that the physical MAC port outputs the PFC pause frame in (d).

\* \* \* \* \*